US010304276B2

(12) United States Patent
Schwartz et al.

(10) Patent No.: US 10,304,276 B2
(45) Date of Patent: May 28, 2019

(54) QUEUE MANAGEMENT SYSTEM AND METHOD

(75) Inventors: Justin Michael Schwartz, Orlando, FL (US); Ross Alan Osterman, Winter Park, FL (US); Jeffrey Lamar Polk, Winter Garden, FL (US)

(73) Assignee: Universal City Studios LLC, Universal City, CA (US)

( * ) Notice: Subject to any disclaimer, the term of this patent is extended or adjusted under 35 U.S.C. 154(b) by 513 days.

(21) Appl. No.: 13/491,289

(22) Filed: Jun. 7, 2012

(65) Prior Publication Data

US 2013/0332509 A1 Dec. 12, 2013

(51) Int. Cl.
*G06F 15/16* (2006.01)
*G07C 11/00* (2006.01)

(52) U.S. Cl.
CPC .......... *G07C 11/00* (2013.01); *G07C 2011/02* (2013.01); *G07C 2011/04* (2013.01)

(58) Field of Classification Search
CPC ............................ G07C 11/00; G07C 2011/02
USPC .......................................................... 709/203
See application file for complete search history.

(56) References Cited

U.S. PATENT DOCUMENTS 5,502,806 A 3/1996 Mahoney et al.
5,566,327 A 10/1996 Sehr
5,978,770 A 11/1999 Waytena et al.
5,987,421 A 11/1999 Chuang
6,078,928 A 6/2000 Schnase et al.
6,142,368 A 11/2000 Mullins et al.
6,173,209 B1 1/2001 Laval et al.
6,259,786 B1 7/2001 Gisby et al.
6,424,623 B1 7/2002 Borgstahl et al.
6,526,158 B1 2/2003 Goldberg
(Continued)

FOREIGN PATENT DOCUMENTS

CN 101498586 8/2009
CN 101833698 9/2010
(Continued)

OTHER PUBLICATIONS

Aug. 2011, "A great Attraction of all Ages", Tripadvisor.*
(Continued)

*Primary Examiner* — Oscar A Louie
*Assistant Examiner* — Messeret F Gebre
(74) *Attorney, Agent, or Firm* — Fletcher Yoder, P.C.

(57) ABSTRACT

A queue management system in accordance with present embodiments may include a data server system including a processor and memory. The queue management system may include an interface system of the data server system configured to receive a reservation request including an indication of a general time period of arrival of a guest to an area. Additionally, the queue management system may include a reservation right allotment system of the data server system configured to correlate a reservation slot for accessing an attraction to identification information for the guest. Further, the queue management system may include a detection system of the data server system configured to determine when a portable identification feature associated with the identification information has arrived to the area, and a reservation assignment system of the data server system configured to establish a reservation to access the attraction at a specific time window.

20 Claims, 7 Drawing Sheets

(56) References Cited

U.S. PATENT DOCUMENTS

| | | | |
|---|---|---|---|
| 6,529,786 | B1 | 3/2003 | Sim |
| 6,629,019 | B2 | 9/2003 | Legge et al. |
| 6,748,364 | B1 | 6/2004 | Waytena et al. |
| 6,785,539 | B2 | 8/2004 | Hale et al. |
| 6,813,608 | B1 | 11/2004 | Baranowski |
| 6,819,759 | B1 | 11/2004 | Khuc et al. |
| 6,845,361 | B1 | 1/2005 | Dowling |
| 6,873,260 | B2 | 3/2005 | Lancos et al. |
| 6,889,098 | B1 | 5/2005 | Laval et al. |
| 6,889,900 | B2 | 5/2005 | Davies et al. |
| 6,937,998 | B1 | 8/2005 | Swarta et al. |
| 7,047,205 | B2 | 5/2006 | Hale et al. |
| 7,136,822 | B2 | 11/2006 | Kimura et al. |
| 7,212,983 | B2 | 5/2007 | Redmann et al. |
| 7,222,080 | B2 | 5/2007 | Hale et al. |
| 7,366,512 | B1 | 4/2008 | Kafalas et al. |
| 7,400,932 | B2 | 7/2008 | Ackley et al. |
| 7,430,411 | B2 | 9/2008 | Sengupta et al. |
| 7,496,445 | B2 | 2/2009 | Mohsini et al. |
| 7,505,474 | B2 | 3/2009 | Walter |
| 7,516,148 | B2 | 4/2009 | Waytena et al. |
| 7,532,941 | B2 | 5/2009 | Hale et al. |
| 7,541,926 | B2 | 6/2009 | Dugan et al. |
| 7,603,321 | B2 | 10/2009 | Gurvey |
| 7,685,009 | B2 | 3/2010 | Halavais et al. |
| 7,685,014 | B2 | 3/2010 | Dean |
| 7,706,904 | B2 | 4/2010 | Jones et al. |
| 7,720,718 | B2 | 5/2010 | Hale et al. |
| 7,729,382 | B2 | 6/2010 | Rosner et al. |
| 7,752,146 | B2 | 7/2010 | Lert |
| 7,756,745 | B2 | 7/2010 | Leet et al. |
| 7,778,937 | B2 | 8/2010 | Ferrara et al. |
| 7,787,965 | B2 | 8/2010 | Hale et al. |
| 7,788,215 | B2 | 8/2010 | Trowbridge et al. |
| 7,801,629 | B2 | 9/2010 | Hale et al. |
| 7,801,752 | B2 | 9/2010 | Neulight |
| 7,817,990 | B2 | 10/2010 | Pamminger et al. |
| 7,826,966 | B2 | 11/2010 | Little et al. |
| 7,837,567 | B2 | 11/2010 | Holzberg et al. |
| 7,895,066 | B2 | 2/2011 | Waytena et al. |
| 7,942,320 | B2 | 5/2011 | Joe |
| 7,966,215 | B1 | 6/2011 | Meyers et al. |
| 8,082,165 | B2 | 12/2011 | Natsuyama et al. |
| 8,126,782 | B1 | 2/2012 | Zhu et al. |
| 8,200,515 | B2 | 6/2012 | Natsuyama et al. |
| 8,253,533 | B2 | 8/2012 | Jones |
| 8,275,767 | B2 | 9/2012 | Shepherd et al. |
| 8,294,549 | B2 | 10/2012 | Samovar et al. |
| 8,330,587 | B2 | 12/2012 | Kupstas et al. |
| 8,396,001 | B2 | 3/2013 | Jung et al. |
| 8,396,727 | B2 | 3/2013 | Waytena et al. |
| 8,416,087 | B2 | 4/2013 | Canora et al. |
| 8,452,708 | B1 | 5/2013 | Birenbaum et al. |
| 8,462,994 | B2 | 6/2013 | Ortiz et al. |
| 8,489,657 | B2 | 7/2013 | Shepherd et al. |
| 8,498,900 | B1 | 7/2013 | Spirin et al. |
| 8,510,163 | B2 | 8/2013 | Hess et al. |
| 8,565,735 | B2 | 10/2013 | Wohlwend |
| 8,577,734 | B2 | 11/2013 | Treyz et al. |
| 8,612,278 | B1 | 12/2013 | Ashley et al. |
| 8,616,984 | B2 | 12/2013 | Mattice et al. |
| 8,618,935 | B2 | 12/2013 | Felt et al. |
| 8,654,965 | B2 | 2/2014 | Dube et al. |
| 8,700,005 | B1 | 4/2014 | Kiraly et al. |
| 8,731,997 | B2 | 5/2014 | Corbett et al. |
| 8,750,576 | B2 | 6/2014 | Huang et al. |
| 8,775,244 | B2 | 7/2014 | Boss et al. |
| 8,793,314 | B2 | 7/2014 | Spivak et al. |
| 8,798,643 | B1 | 8/2014 | Boyle et al. |
| 8,830,030 | B2 | 9/2014 | Arthurs et al. |
| 8,831,963 | B2 | 9/2014 | Backer et al. |
| 8,879,440 | B2 | 11/2014 | Guo et al. |
| 8,896,485 | B2 | 11/2014 | Mendelson |
| 8,897,808 | B2 | 11/2014 | Farris |
| 8,924,432 | B2 | 12/2014 | Richards et al. |
| 8,948,541 | B2 | 2/2015 | Neville et al. |
| 8,949,146 | B2 | 2/2015 | Fisher |
| 8,954,091 | B1 | 2/2015 | Boyle et al. |
| 8,972,048 | B2 | 3/2015 | Canora et al. |
| 9,002,736 | B2 | 4/2015 | Wohlwend et al. |
| 2002/0007292 | A1 | 1/2002 | Paxton et al. |
| 2002/0046068 | A1 | 4/2002 | Koh |
| 2002/0070865 | A1 | 6/2002 | Lancos et al. |
| 2002/0082897 | A1 | 6/2002 | Menelly et al. |
| 2002/0099576 | A1 | 7/2002 | Macdonald et al. |
| 2002/0116233 | A1 | 8/2002 | Kuge |
| 2002/0116235 | A1* | 8/2002 | Grimm .................. G06Q 10/02 705/5 |
| 2002/0174003 | A1* | 11/2002 | Redmann et al. ................ 705/8 |
| 2003/0041105 | A1 | 2/2003 | Patrick |
| 2003/0093167 | A1 | 5/2003 | Sim |
| 2003/0102956 | A1* | 6/2003 | McManus et al. ............ 340/5.2 |
| 2003/0195760 | A1 | 10/2003 | Kim et al. |
| 2004/0006497 | A1 | 1/2004 | Nestor et al. |
| 2004/0059614 | A1 | 3/2004 | Brwon et al. |
| 2004/0100390 | A1 | 5/2004 | Giraldin et al. |
| 2004/0117219 | A1 | 6/2004 | Sugimoto et al. |
| 2004/0117528 | A1 | 6/2004 | Beacher et al. |
| 2004/0225540 | A1* | 11/2004 | Waytena et al. .................. 705/5 |
| 2005/0045710 | A1 | 3/2005 | Burke |
| 2005/0070258 | A1 | 3/2005 | Stanco |
| 2005/0080675 | A1 | 4/2005 | Lovegreen et al. |
| 2005/0198107 | A1 | 9/2005 | Cuhls et al. |
| 2005/0200455 | A1 | 9/2005 | Veni et al. |
| 2005/0240453 | A1 | 10/2005 | Lyons |
| 2006/0002413 | A1 | 1/2006 | Tsutazawa et al. |
| 2006/0068787 | A1* | 3/2006 | Deshpande et al. ....... 455/435.3 |
| 2006/0147005 | A1 | 7/2006 | Taub |
| 2006/0273920 | A1 | 12/2006 | Doan et al. |
| 2007/0042748 | A1 | 2/2007 | MacArthur |
| 2007/0064904 | A1 | 3/2007 | Wesley |
| 2007/0088701 | A1 | 4/2007 | Rao |
| 2007/0130313 | A1 | 6/2007 | King |
| 2007/0156846 | A1 | 7/2007 | Seward et al. |
| 2007/0168390 | A1 | 7/2007 | Mardirossian |
| 2007/0174042 | A1 | 7/2007 | Thompson |
| 2007/0203763 | A1 | 8/2007 | Ackley et al. |
| 2007/0225911 | A1 | 9/2007 | Chanick et al. |
| 2007/0233291 | A1 | 10/2007 | Herde et al. |
| 2007/0244731 | A1 | 10/2007 | Barhydt et al. |
| 2007/0286220 | A1 | 12/2007 | Stenning |
| 2008/0022089 | A1* | 1/2008 | Leedom ................ H04L 63/068 713/156 |
| 2008/0040172 | A1 | 2/2008 | Watkins |
| 2008/0055051 | A1 | 3/2008 | Snyder et al. |
| 2008/0071587 | A1 | 3/2008 | Granucci et al. |
| 2008/0080445 | A1 | 4/2008 | Bayne et al. |
| 2008/0086377 | A1 | 4/2008 | Jain |
| 2008/0133283 | A1 | 6/2008 | Backer et al. |
| 2008/0201227 | A1 | 8/2008 | Bakewell et al. |
| 2008/0215385 | A1 | 9/2008 | Veitch et al. |
| 2008/0267107 | A1 | 10/2008 | Rosenberg |
| 2008/0270230 | A1 | 10/2008 | Hendrickson et al. |
| 2008/0270305 | A1 | 10/2008 | Andreasson et al. |
| 2008/0275630 | A1 | 11/2008 | Regienczuk |
| 2008/0301264 | A1 | 12/2008 | Mathai et al. |
| 2008/0319935 | A1 | 12/2008 | Chandak |
| 2008/0319992 | A1 | 12/2008 | Mathai et al. |
| 2009/0063205 | A1 | 3/2009 | Shibasaki |
| 2009/0104874 | A1 | 4/2009 | Ellis |
| 2009/0112638 | A1 | 4/2009 | Kneller et al. |
| 2009/0216547 | A1 | 8/2009 | Canora et al. |
| 2009/0222291 | A1* | 9/2009 | Montavon ............ G06Q 10/025 705/6 |
| 2009/0259556 | A1 | 10/2009 | Carroll et al. |
| 2009/0267728 | A1* | 10/2009 | Mayrand ........................ 340/5.6 |
| 2009/0281903 | A1 | 11/2009 | Blatstein |
| 2009/0286559 | A1 | 11/2009 | Janas et al. |
| 2009/0313062 | A1 | 12/2009 | Natsuyama et al. |
| 2009/0319306 | A1 | 12/2009 | Chanick |
| 2010/0017238 | A1 | 1/2010 | Johnson et al. |
| 2010/0017725 | A1 | 1/2010 | McCarthy et al. |
| 2010/0062838 | A1 | 3/2010 | Nguyen et al. |
| 2010/0063854 | A1 | 3/2010 | Purvis et al. |

(56) References Cited

U.S. PATENT DOCUMENTS

| | | | | |
|---|---|---|---|---|
| 2010/0111377 | A1* | 5/2010 | Monroe | 382/118 |
| 2010/0114968 | A1 | 5/2010 | Dean | |
| 2010/0161432 | A1 | 6/2010 | Kumanov et al. | |
| 2010/0262507 | A1 | 10/2010 | Woycik et al. | |
| 2010/0308964 | A1 | 12/2010 | Ackley et al. | |
| 2010/0317377 | A1 | 12/2010 | Zou et al. | |
| 2010/0321149 | A1 | 12/2010 | Foster | |
| 2010/0328025 | A1 | 12/2010 | Razdan | |
| 2011/0022425 | A1* | 1/2011 | Block et al. | 705/5 |
| 2011/0040655 | A1 | 2/2011 | Hendrickson et al. | |
| 2011/0178960 | A1 | 7/2011 | Dever et al. | |
| 2011/0227726 | A1 | 9/2011 | Lee et al. | |
| 2011/0307547 | A1* | 12/2011 | Backer | G06Q 10/1095 709/203 |
| 2012/0016745 | A1 | 1/2012 | Hendrickson et al. | |
| 2012/0040751 | A1 | 2/2012 | Peters | |
| 2012/0116789 | A1 | 5/2012 | Boss et al. | |
| 2012/0116863 | A1 | 5/2012 | Boss et al. | |
| 2012/0147169 | A1 | 6/2012 | Harper et al. | |
| 2012/0197746 | A1 | 8/2012 | Harris | |
| 2012/0197949 | A1 | 8/2012 | Taylor et al. | |
| 2012/0271834 | A1 | 10/2012 | Canora et al. | |
| 2012/0287281 | A1 | 11/2012 | Williams et al. | |
| 2012/0323646 | A1 | 12/2012 | Dube et al. | |
| 2013/0018661 | A1 | 1/2013 | Padgett et al. | |
| 2013/0018684 | A1 | 1/2013 | Padgett et al. | |
| 2013/0041696 | A1* | 2/2013 | Richard | G06Q 50/14 705/5 |
| 2013/0045804 | A1 | 2/2013 | Ruke | |
| 2013/0066660 | A1 | 3/2013 | Kopitzke et al. | |
| 2013/0073325 | A1 | 3/2013 | Ross | |
| 2013/0090957 | A1 | 4/2013 | Popkey et al. | |
| 2013/0091146 | A1 | 4/2013 | Stanger et al. | |
| 2013/0102248 | A1 | 4/2013 | Jay et al. | |
| 2013/0103519 | A1 | 4/2013 | Kountotsis et al. | |
| 2013/0124234 | A1 | 5/2013 | Nilsson et al. | |
| 2013/0151296 | A1 | 6/2013 | Waytena et al. | |
| 2013/0165154 | A1 | 6/2013 | Joshi | |
| 2013/0204651 | A1 | 8/2013 | Gulec et al. | |
| 2013/0204656 | A1 | 8/2013 | Mahfouda et al. | |
| 2013/0254027 | A1 | 9/2013 | Silverman et al. | |
| 2013/0293720 | A1 | 11/2013 | Tyson et al. | |
| 2013/0332208 | A1 | 12/2013 | Mehta | |
| 2013/0332509 | A1 | 12/2013 | Schwartz et al. | |
| 2014/0006451 | A1 | 1/2014 | Mullis et al. | |
| 2014/0046802 | A1 | 2/2014 | Hosein et al. | |
| 2014/0074404 | A1 | 3/2014 | Hassan | |
| 2014/0074523 | A1 | 3/2014 | Turner et al. | |
| 2014/0089075 | A1 | 3/2014 | Sanchis et al. | |
| 2014/0108149 | A1 | 4/2014 | Jabara et al. | |
| 2014/0132400 | A1 | 5/2014 | Heaven et al. | |
| 2014/0136105 | A1 | 5/2014 | Chakraborty et al. | |
| 2014/0156290 | A1 | 6/2014 | Kozicki et al. | |
| 2014/0156319 | A1 | 6/2014 | Deeb | |
| 2014/0162693 | A1 | 6/2014 | Wachter et al. | |
| 2014/0235276 | A1 | 8/2014 | Lefkowitz | |
| 2014/0236653 | A1 | 8/2014 | Farrell | |
| 2014/0249866 | A1 | 9/2014 | Popkey et al. | |
| 2014/0257889 | A1 | 9/2014 | Ashley et al. | |
| 2014/0324488 | A1 | 10/2014 | Boccelli | |
| 2014/0343976 | A1 | 11/2014 | Ahluwalia et al. | |
| 2014/0343977 | A1 | 11/2014 | Macina | |
| 2014/0343995 | A1 | 11/2014 | Backer et al. | |
| 2014/0364148 | A1 | 12/2014 | Block et al. | |
| 2014/0378233 | A1 | 12/2014 | Weston et al. | |
| 2015/0025919 | A1 | 1/2015 | West | |
| 2015/0026008 | A1 | 1/2015 | Werbitt | |
| 2015/0058324 | A1 | 2/2015 | Kauwe | |
| 2015/0080081 | A1 | 3/2015 | Kessman et al. | |
| 2015/0081348 | A1 | 3/2015 | Vera et al. | |
| 2015/0083803 | A1 | 3/2015 | Herron et al. | |
| 2015/0088562 | A1 | 3/2015 | Woods | |
| 2015/0088671 | A1 | 3/2015 | Xiong et al. | |
| 2015/0088782 | A1 | 3/2015 | Zhang | |

FOREIGN PATENT DOCUMENTS

| | | |
|---|---|---|
| CN | 201607767 | 10/2010 |
| EP | 0958553 | 11/1999 |
| EP | 1690222 | 8/2006 |
| EP | 1696327 | 8/2006 |
| JP | 2002032800 | 1/2002 |
| JP | 2004178041 | 6/2004 |
| JP | 2006-134260 | 5/2006 |
| WO | 2003034350 | 4/2003 |
| WO | 2004047353 | 6/2004 |
| WO | 2005038688 | 4/2005 |
| WO | 2005124699 | 12/2005 |
| WO | 2008128583 | 10/2008 |
| WO | 2008144283 | 11/2008 |
| WO | 2010089771 | 8/2010 |

OTHER PUBLICATIONS

J. Borrell, S. Robles, J. Serra and A. Riera, "Securing the itinerary of mobile agents through a non-repudiation protocol," Proceedings IEEE 33rd Annual 1999 International Carnahan Conference on Security Technology (Cat. No. 99CH36303), Madrid, Spain, 1999, pp. 461-464.*

A. A. Niknafs, M. E. Shiri and M. M. Javidi, "A case-based reasoning approach in e-tourism: tour itinerary planning," 14th International Workshop on Database and Expert Systems Applications, 2003. Proceedings., Prague, Czech Republic, 2003, pp. 818-822.*

Gabovich, E. Ya, "Constant discrete programming problems on substitution sets", vol. 12, issue5, pp. 786-7+3, 2011.*

Invitation to Pay Additional Fees and, Where Applicable, Protest Fee, International Application No. PCT/US2013/044785, dated Sep. 12, 2013.

CN 201380041867.5 Office Action dated Jan. 21, 2016.

Nakanowatari, Akihiro, "Face Recognition that is Robust Against Pose and Illumination Changes", Panasonic Technical Journal, Panasonic Corporation, Jan. 15, 2009, vol. 54, No. 4, pp. 24-29.

JP 2015-516251 Office Action dated Jul. 24, 2017.

JP 2015-516251 Office Action dated Mar. 22, 2018.

EP 13732309.3 European Examination Report dated Oct. 27, 2017.

* cited by examiner

QUEUE MANAGEMENT SYSTEM AND METHOD

FIELD OF DISCLOSURE

The present disclosure relates generally to the field of amusement parks. More specifically, embodiments of the present disclosure relate to methods and equipment utilized to control wait times in attraction queues by providing reservations.

BACKGROUND

Since the early twentieth century, amusement parks have substantially grown in popularity. In order to address this increasing demand, amusement parks have been expanding at a tremendous rate by adding attractions and space. The addition of attractions (e.g., rides, restaurants, shops, and shows) generally provides an amusement park with additional capacity to handle a larger number of guests. However, the additional attractions also typically provide potential guests with an incentive to visit the amusement park. Thus, while a particular amusement park may add additional capacity, the additional capacity does not always result in reduced wait times for attractions because there is often a corresponding increase in attendance. Further, due to operating efficiencies, it is often desirable to limit the availability of attractions during low attendance times. Thus, queuing for attractions is a perennial issue for amusement parks.

While guests have demanded bigger, better, and more elaborate attractions, they also require and expect a positive overall experience. Providing a positive overall experience for amusement park guests entails addressing certain issues related to queuing for attractions. Indeed, it is now recognized that park guests can be deterred from returning to a particular amusement park due to negative experiences with queue waiting times. Further, guests may be prevented from accessing amusement park businesses (e.g., shops) due to time spent waiting in queues. Indeed, in the past, guests have been forced to wait hours in line to experience some of the more popular attractions at an amusement park. Additionally, it is now recognized that park capacity does not always equal guest utilization of that capacity due to individual guest preferences for certain attractions over others. Accordingly, it is now recognized that it is desirable to improve amusement park queuing systems and methods.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
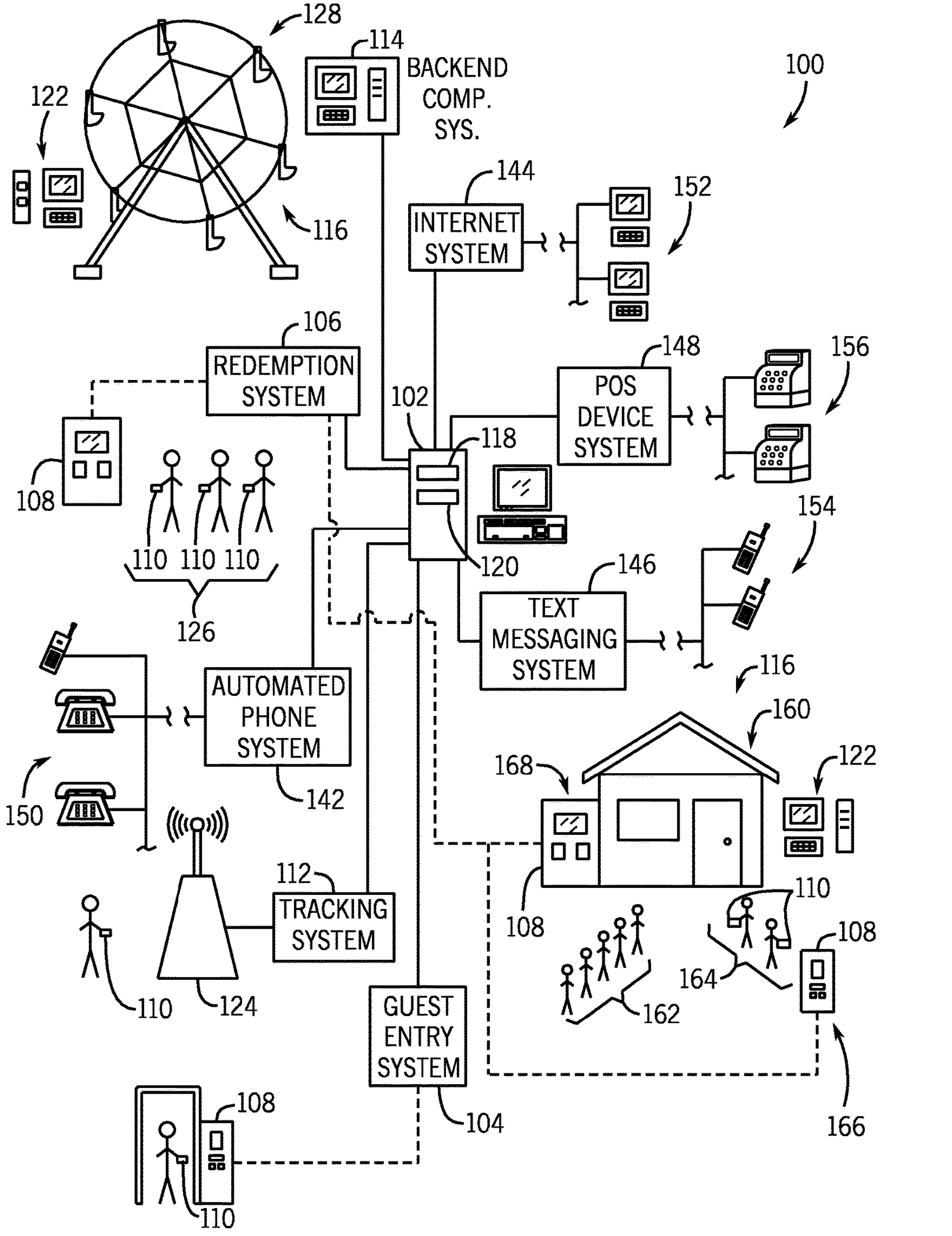
FIG. 1 is a schematic representation of an amusement park including a reservation system in accordance with present techniques.

The present disclosure relates generally to methods and systems for controlling wait times in amusement park attraction queues by dynamically managing reservations for amusement park attractions including shows, restaurants, rides, shops, and so forth. Present embodiments include a system with an electronic data server and respective applications capable of communicating and monitoring metrics or characteristics related to reservations for attractions in an amusement park, and controlling queue flow characteristics. The system may include a verification system, a tracking system, a redemption system, mobile devices, and backend computers and devices. The system may be configured to receive one or more reservation requests at a time and assign a general or specific time frame for the reservation based on information provided by a user and/or based on other data (e.g., data regarding operation of a related attraction or data related to detected locations of guests holding reservations). Further, present embodiments are configured to access or modify one or more existing reservations and/or adjust queue characteristics (e.g., access ratios) based on changes in the reservation requests, changes in guest scheduling, guest location, data regarding an attraction or attractions related to a reservation, entitlement levels (e.g., based on tiered payment options for various levels of access) and so forth. With regard to entitlement levels, tiered approaches to pricing for various features or components may be available, including micropayments for certain services or tasks. For example, a guest may provide a micropayment to receive periodic updates regarding short queues in certain areas of the park.

The system may enable guests to utilize mobile or wireless technology to wait in a virtual queue for a particular attraction or attractions while experiencing other attractions or relaxing in other areas in or away from the amusement park. Indeed, present embodiments include a system configured to communicate with one or more attractions related to a reservation request or an existing reservation to dynamically adjust and optimize guest waiting experiences in real-time, and communicate updates to guests (e.g., via mobile or wireless technology). Present embodiments may facilitate communication with guests via portable communication devices, such as cellular telephones, pagers, and other wireless devices. Such devices may be referred to as mobile devices. Communications referenced herein between a system and guests include email, text, video, web-based, and audio communications from the system to the mobile devices or the like. The location of guests within the amusement park may also be obtained by monitoring such mobile devices or other means (e.g. facial recognition systems, ticket scanning, etc.). In some embodiments, communication with guests may be achieved via publicly accessible displays. For example, kiosks with communication features (e.g., computers capable of accessing a network) may be positioned throughout the amusement park.

In accordance with present techniques, a reservation system is configured to provide an interface for a user or guest to make a reservation for access to one or more attractions of an amusement park during a visit. Reservations may be made for a group of guests or a single guest prior to arriving at the amusement park or while present in the amusement park. Indeed, functions of the system described herein may include communicating with a single guest or a group.

Making a reservation for multiple guests, as a group, may be facilitated by enabling association of all of the corresponding tickets with a single guest's ticket. These reservations may be made prior to or during the guest's visit to the amusement park using a laptop computer, desktop computer, mobile device, or other access device. Such a reservation may be acquired via on-line resources, via direct access to a portal of the reservation system, via a telephone system, and so forth.

In accordance with the present disclosure, tickets may include various types or combinations of credentials that may be used to verify access rights to an attraction (e.g., an amusement park). The tickets (e.g., paper tickets, biometrics, or electronic tickets) may be utilized to verify access rights at a current time or future access rights. When tickets are not purchased together, present embodiments may associate the tickets as a group. This will allow any member of a group of guests to acquire reservations for the group. For example, if a group of several guests arrive at the amusement park and each separately purchases tickets, one of the group's guests can use present embodiments to make one or more reservations for the group. Present embodiments are capable of associating the reservation for the group with a single ticket, which becomes the "master ticket". When the reservation is redeemed, the master ticket associated with the reservation must be confirmed first and then the tickets of the remaining group members are confirmed. Several techniques and systems may be utilized to associate tickets with a master ticket. This may include scanning the tickets to confirm identification information, authenticity, and reservation information. During the confirmation process, each ticket may be associated with the remaining reservations in the system. Accordingly, subsequent reservations may not require that the master ticket be confirmed before a reservation can be used.

Further, reservations may be made prior to a guest visiting the amusement park without specifically designating a time frame for the reservation. For example, a reservation may be established for a particular date without designating an hourly time range for the reservation. However, in some embodiments, an initial slot of time may be defined based on a guest's predicted arrival time to the amusement park. For example, this predicted arrival time may be designated as the morning or the afternoon. In such embodiments, once the guest arrives, a specific time frame (e.g., 3:00 PM to 3:15 PM) may be assigned for the reservation depending on the guest's arrival time and the availability of reservation time slots for associated attractions. It should be noted that present embodiments may be utilized to make multiple reservations for one or more attractions. Present embodiments may also facilitate communication between the reservation system and guests to provide for dynamic updating of reservation times and to provide crowd control by encouraging guests to visit particular areas of the amusement park. Further, present embodiments may efficiently accommodate schedule changes of guests by facilitating reservation trading within the reservation system. For example, if a guest would prefer to change an assigned reservation, the guest may use the reservation system to acquire a new reservation at a more convenient time, returning the original reservation to available inventory or reassigning it, if applicable.

Referring now to FIG. 1, a system for managing theme park attraction queues is generally indicated by reference numeral 100. The queue management system 100 includes a data server system 102, a guest entry system 104 (e.g., a ticketing system or access validating system), a redemption system 106, data readers 108, portable identification features (PIFs) 110, a tracking system 112, a backend computer system 114, and at least one attraction 116. Certain components of the system 100 may be extensions or modules of the data server system 102, and other components may be separate features that communicate with the data server system 102. Indeed, the data server system 102 may include one or numerous computers with one or more processors 118 and memories 120 (e.g., a hard drive or other tangible, machine-readable medium that are non-transitory, which merely means that they are not signals). Indeed, in one embodiment, the data server system 102 includes one or more redundant servers to ensure reliability and to enable maintenance. The memory (or memories) 120 may store code or instructions that, when implemented by the processor (or processors) 118, cause the reservation system 100 to perform certain functions in accordance with present embodiments. Indeed, certain component systems (e.g., the guest entry system 104) of the system 100 may include code stored in memory 120 capable of being activated by a processor 118. It should be noted that the present disclosure may refer to a grouping of components of the system 100 or all of the components of the system 100 as the "reservation system 100" or the "system 100". Thus, actions indicated as being performed by the reservation system 100 or system 100 may include actions performed by a subset of the system 100. For example, the data server system 102 may coordinate with a data reader 108 of the guest entry system 104 to perform the action of determining whether a particular guest has checked in (e.g., passed through an entry or portal) to the amusement park. This action may be referred to as having been performed by the reservation system 100.

In the illustrated embodiment, the attraction 116 includes a monitoring and/or data maintenance system 122 that may be utilized to monitor and/or provide information regarding operation of the associated attraction 116. These monitoring and/or data maintenance systems 122 may be referred to as attraction systems 122 and may include one or more of a computer, a control system, and monitoring features (e.g., sensors and cameras). In some embodiments, the attraction systems 122 basically include ports or workstations for entering information into, retrieving data from, or otherwise communicating with the data server system 102. For example, the attraction systems 122 may enable employees of the amusement park to input data (e.g., wait times, attraction capacity, and downtime) regarding operation of the related attraction. In other embodiments, the attraction systems 122 are separate systems that are configured to operate independently and to communicate with the data server system 102. As an example, the attraction systems 122 may be capable of logging all activity (e.g., downtime, statistics regarding requested and redeemed reservations, availability, and quantity of traffic through the attraction) associated with reservations for the corresponding attractions 116 to facilitate data analysis by the data server system 102 and/or the backend computer systems 114. In one embodiment, the system 100 is capable of expansion to enable storage and processing of large amounts of data. Data obtained from the attraction systems 122 may be submitted for data analysis by the system 100, the results of which are used to assist with control of queuing characteristics and reservations, as will be discussed further below.

The PIFs 110 may include tickets. Specifically, for example, the PIFs 110 may include printed tickets, biometrics, and/or mobile devices. As an example, the PIFs 110 may include printed strips of material, facial recognition, finger scans, cellular telephones, microchips (e.g., a memory) or circuitry installed in cards or bracelets, pagers, or wireless devices that can be provided by the amusement park or owned by the guests. Indeed, a particular cellular telephone, which may be owned by a guest or obtained from the amusement park, may be associated with a guest pass. The term guest pass may be used to generally refer to the right of a guest to access certain attractions or the amusement park in general. For example, a guest pass does not necessarily have to be a tangible item. A guest can purchase a guest pass, which is then associated with identification information (e.g., a password, serial number, name, or numeric code) of the guest on the system 100 such that the identity of the guest can be confirmed and the rights of the guest can be ascertained. This association may be performed by a portable identification feature assignment system of the data server system 102. Thus, a guest pass can be associated with a PIF 110 that is assigned to a particular guest, and the PIF 110 can then be used to confirm rights of the guest via the system 100. Depending on this information, an amusement park employee or system can grant or deny a guest access to certain attractions 116 or rights to make reservations. In some embodiments, the PIFs 110 are capable of wireless detection and provide access to identification information associated with the PIFs 110. For example, the tracking system 112 may employ device monitors 124 to track PIFs 110 in the amusement park and identify the location of particular guests within a range of space. The system 100 also detects whether a guest has arrived in the amusement park by monitoring the guest entry system 104 and whether certain PIFs 110 associated with guests have been detected. This may include scanning a ticket, scanning barcode from the screen of a portable device, pinging a portable device, or the like, using the tracking system 112. Detection of entry of a guest into the amusement park may be confirmed at purchase of the guest pass and association with the PIF 110 by, for example, scanning the ticket or associating identification information for a mobile device with a guest pass.

As indicated above, a guest (or agent of the guest) may use present embodiments to obtain reservations to one or more attractions in order to avoid or limit wait time in attraction queues, such as a queue 126 for a particular ride 128. The system 100 may be designed to accommodate making, modifying, or accessing multiple reservations at one time without system slowdowns and with sufficient processing capability to ensure adding additional capacity does not affect operational speed. Reservations through the system 100 may be acquired by a guest remotely or from within the amusement park via an automated phone system 142, an Internet system 144 (e.g., a website or mobile site), a text messaging system 146, or a point-of-sale (POS) device system 148. The automated phone system 142 is accessible from and includes a network of phones 150. The Internet system 144 is in communication with the Internet 152 and, in some embodiments, includes two separate websites, wherein a first website accommodates guests wishing to make reservations and a second website provides access for service representatives to perform administrative tasks in addition to make and revise reservations. The text messaging system 146 is in communication with a network of wireless devices 154 (e.g., cellular telephones). The POS device system 148 includes and/or is in communication with POS devices 156.

The system 100 illustrated in FIG. 1 is capable of communicating with various different types of wireless or mobile devices, which may be owned by the guests or supplied by the amusement park. Indeed, the PIFs 110 may include communication features that enable all guests with reservations to receive messages and updates from the system 100. However, a mobile device may be used for communication with the system 100 without using the mobile device as a PIF 100. As an example of system communications, a text message may be sent from the text messaging system 146 to a mobile device functioning as a PIF 110 and assigned to a guest, wherein the text message indicates that a particular reservation time has been moved back due to technical difficulties with a particular attraction. The text messaging system 146 may be capable of sending a minimum of 20,000 automated text messages per minute with delay notifications, information notifications, advertisements, and the like. Further, various other components of the system 100 may be capable of communicating wirelessly with mobile devices or other wireless system components. For example, the data readers 108 and POS devices 156 and so forth may be wireless devices that are capable of communicating with the data server system 102 in a wireless manner. It should be noted that reference to mobile devices indicates items that a guest can readily transport, such as a cellular telephone, a pager, or the like.

When a guest is requesting a reservation right from offsite, as a component of the reservation process, the guest may be prompted by the system 100 (e.g., an interface module of the data server system 102) to provide the system 100 with an estimated arrival time (e.g., morning or afternoon) to an area, such as to the amusement park or to a particular attraction 116 (e.g., a segregated area of the amusement park). Such a request may be received through an interface system of the data server system 102 that is capable of receiving communications and input data from a guest (which includes current and potential patrons of the amusement park). Such communication may be provided via one or more of the automated phone system 142, the Internet system 144, the text messaging system 146, or the POS device system 148. A specific reservation will not be established until the guest actually arrives. Rather, a reservation allotment system of the data server system 102 sets aside a reservation slot based on the estimated arrival time and correlates the reservation slot to identification information for the guest. Providing an estimated arrival time may be required to establish a reservation right during the time period of the associated visit.

A detection system (e.g., the tracking system 112, the guest entry system 104, and/or the data readers 108) determines if the portable identification feature has arrived at a designated area (e.g., the amusement park). If a guest fails to arrive during a predicted time period (e.g., during morning hours), the system 100 may contact the guest and reschedule or cancel the associated reservation right based on feedback from the guest and/or other criteria. Similarly, once a guest is confirmed to be present in the amusement park, a reservation assignment system of the data server system 102 may define a specific reservation time and the guest may be informed of the specific reservation time (e.g., a 15 minute window to arrive at the attraction 116). For example, a guest that has an existing reservation right or that has requested a reservation may receive text messages or recorded audio messages from the system via one or more of the automated phone system 142, the Internet system 144, the text messaging system 146, or the POS device system 148. As a specific example, upon checking in at a kiosk including a POS device 156, the guest may be notified via the POS device system 148 that a specific time for a reservation has been established by printing a message and the reservation time on a receipt produced by the POS device 156. Similarly, communications from the system 100 may be provided via the automated phone system 142, the Internet system 144, or the text messaging system 146 to the guest via voice messages, text messages, or emails sent to a mobile device and/or the PIF 110 assigned to the guest (e.g., the guest's personal communication device or a device supplied by the amusement park). The specific time is narrower than the general time and will typically be defined within the general time but may be later.

Additionally, the system 100 in the illustrated embodiment facilitates communication from the guests to the system 100. For example, a user may communicate that a reservation is no longer desired or that there will be a delay in the guest's arrival to the amusement park or individual attraction 116 by submitting data to the system 100 via a mobile device, which may include the PIF 110. This type of information may be utilized by the system 100 to manage the reservations of the guest and other guests. Further, such information may be utilized by the system 100 to facilitate queue management. For example, cancelations may be utilized to adjust ratios of standby queues, express queues, very important person (VIP) queues, single rider queues, and reservation queues or a number of guests allowed access via a reservation entry. Indeed, the system 100 may communicate such data to attraction control systems (e.g., attraction systems 122) or amusement park employees charged with queue management. This may include provision of an access management system of the data sever system 102 or attraction system 122 capable of controlling an adjustable ratio variable that adjusts certain queue characteristics (e.g., number of standby line entries) relative to reservation entries to maintain a desired wait time, and capable of providing information regarding nearby attractions with low wait times (e.g., the nearest attraction with a lower wait time than the reservation queue or the lowest wait time).

Communications to the system 100 from guests may include periodic updates regarding respective locations of the PIFs 110 or updates entered by the guests via a data entry component of the each of the PIFs 110. As an example, the PIFs 110 may include global positioning systems (GPS), radio frequency identification (RFID) tags, or other detectable features that can be used to determine locations of the PIFs 110. Specifically, for example, if a PIF 110 is scanned as part of a purchase detected by a data reader 108, or detected by a device monitor 124 positioned in the amusement park, such information may be employed to determine a general location of the guest with which the system 100 has associated the PIF 110. Further, a guest may be able to submit requests or updates via a data entry feature (e.g., keyboard or other interface of the PIF 110). For example, the PIFs 110 may each include a keyboard or a basic input that enables a guest to respond affirmatively or negatively to questions issued by the system 100, such as questions regarding whether the guest intends to be present for a pending reservation. Other mobile devices not being employed as PIFs 110 may also be used to communicate with the system 100.

In addition to communications regarding reservations, communications between the system 100 and a guest may include other types of information or data, such as information related to crowd flow through the amusement park. For example, the system 100 may utilize location data from the PIFs 110 and other sources to assemble crowd flow data. This data may then be employed by the system 100 to encourage guest distribution throughout the amusement park, thus reducing crowds. For example, an electronic coupon, which may be limited to certain guests by identification information, for a nearby attraction may be issued by the system 100 via the PIFs 110 or a notice may be distributed indicating that short waits are available at certain attractions. The system 100 is capable of pushing information (e.g., coupons, advertisements, and wait times) out to guests via a web portal or the like. Specifically, for example, the system 100 may send out a text message to all park patrons that have a PIF 110 with particular identification information that will allow these park patrons to receive a discount at a shop or restaurant. Further, the system 100 may track usage of these discounts such that the system 100 is aware of time and location of use, which can be used for crowd control (e.g., submission of additional notifications based on location, item purchased, and so forth). Additionally, the system 100 may automatically adjust reservations based on location and availability. For example, a reservation may be adjusted because a patron is located too far away from the attraction (e.g., as determined by a purchase time of an item) to reach the associated attraction in time for the reservation or a guest's place in line may be adjusted because the guest was delayed in a restaurant due to slow service.

As with other types of information discussed above, the system 100 may communicate crowd flow information between attractions 116 and dynamically adjust queue characteristics (e.g., admission ratios between reservations and standby lines) to move toward optimization of guest waiting times for the attractions. For example, adjustments may be made to a ratio of guests allowed to enter a queued souvenir shop 160 from a standby line 162 (e.g., an area in which guests line up to enter an attraction without a reservation) relative to guests allowed to enter the souvenir shop 160 from a reservation line 164 (e.g., an area in which guests line up to enter an attraction based on a reservation) based on remaining reservations to enter the souvenir shop 160 and availability of access to attractions throughout the amusement park. It should be noted that guests entering the reservation line 164 may confirm a right to enter the reservation line or queue 164 by allowing a data reader 108 access to an associated PIF 110, and may confirm access to entering the souvenir shop 160 by allowing a different data reader 108 access to the associated PIF 110. Thus, the data reader 108 is utilized as an entry access confirmation feature. This dual confirmation may be utilized to monitor queue wait times. Similarly, a data reader 108 may be employed as an access confirmation feature by confirming that a guest has entered an attraction (e.g., entered a ride vehicle of an attraction).

The system 100 may also facilitate guest-to-guest communications and system-directed communications based on common characteristics of certain guests. Specifically, present embodiments may collect demographic data during a registration process or through an opting in process. A registration process may include a data entry requirement or any utilization of the system 100 by a guest that facilitates acquisition of the demographic data. For example, registration may include utilization of a cellular telephone by a guest in conjunction with the system 100, and the acquired demographic data may include an area code of the phone number associated with the cellular telephone. Direct guest-to-guest communication may be established between PIFs 110 assigned to the guests via the system when the PIFs 110 are capable of communication, or direct guest-to-guest communication may be established between communication devices provided by the guests or park and known by the system 100. Similarly, such communication may be established via enabling access to social media, which may also employ the PIFs 110 or known communication devices.

Accordingly, guests with common characteristics based on their registration data or selected option can provide notices to one another. For example, guests from a similar geographic region may notify each other of activities that might be of common interest. Similarly, the system 100 may provide information regarding activities that may be of common interest based on demographic data. Among other things, the system 100 may facilitate posting status updates, notifying guests in a certain group of activities relevant to the group, or providing notice of certain conditions in the park.

In one embodiment of the present disclosure, a PIF 110 (e.g., an RFID transponder) is provided to each guest or group as they enter the amusement park. This may include the amusement park renting, loaning, or simply selling the PIFs 110 to guests. Each PIF 110 may be programmed and assigned in the system 100 to uniquely identify each guest or group. In some embodiments, providing each guest with a PIF 110 may include instructing the system to recognize and/or communicate with a device owned by a guest such that the device owned by the guest is employed and activated by the system 100 as a PIF 110. For example, the system 100 may be used to download an application onto a guest's cellular telephone such that the system 100 associates the guest's cellular telephone with an amusement park ticket and with the guest (or a group). In another embodiment, the system 100 may be programmed to detect the PIF 110 and recognize association with a valid guest pass. Further, as discussed above, different types of PIFs 110 may include paper or plastic tickets or bracelets with integral detection devices. For example, bracelets that include integral circuitry that stores a unique identifier in a memory and/or provides communication capabilities (e.g., the ability to communicate with a global positioning unit or other positional detection system). Automatic identification and data capture (AIDC) devices such as RFID tags may be used, for example. Other features of PIFs 110 usable with present embodiments may include barcodes, magnetic strips, pin numbers, cellular telephone identifiers, hotel room keys, credit cards, combinations thereof, and so forth. Any identification components of the PIFs 110 or combinations of such devices may have a reciprocal reader that communicates with the data readers 108 or other guest identifiers (e.g., POS devices 156) to track movement and/or spending of guests in and/or around the amusement park. This enables tracking of crowd flow. Furthermore, in some embodiments, the PIFs 110 include handheld electronic devices with display screens that enable communications regarding crowd flow to facilitate directing of guests to certain areas of the park.

In one embodiment, the system 100 is capable of controlling access and managing reservations to attractions 116 by facilitating communication between the data server system 102, which serves as a central queue control system, and the guest entry system 104. Indeed, coordination between the data server system 102 and the guest entry system 104 facilitates identification of the arrival and presence in the amusement park of guests with reservations, which assists with the management of reservations. Indeed, reservations may be changed or canceled depending on an algorithm that takes arrival time to the amusement park into account. Communication of the arrival and/or presence of a guest may be achieved by polling the guest entry system 104 with the data server system 102 at certain intervals (e.g., every 30 or 60 seconds) or at certain times, or by sending identification data for the associated PIF 110 from the guest entry system 104 to the data server system 102 each time a guest is admitted to the amusement park via the guest entry system 104. For example, the data reader 108 associated with a particular attraction 116 may communicate with the data server system 102 or directly with the guest entry system 104 to confirm that a guest has a valid park entry ticket. Specifically, for example, a guest may supply the PIF 110 assigned to the guest to the data reader 108 for a particular attraction 116. The data reader 108 may then acquire information from the PIF 110 and communicate with other system components to confirm that the PIF 110 is associated with a valid reservation and that the PIF 110 is known to be properly present in the amusement park. This may include confirming that the PIF 110 (e.g., a cellular telephone) has been identified as entering the amusement park (e.g., scanned during entry) via the guest entry system 104 and that the PIF 110 has been associated with a reservation for the particular attraction 116 or any attraction 116. In some embodiments, a guest must use the PIF 110 to communicate with a first data reader 166 in order to enter the queue 164 and then use the PIF 110 to communicate with a second data reader 168 to enter the attraction 116. This may facilitate monitoring of queue characteristics.

In one embodiment, the system 100 enables making a reservation for an individual or a group to access an attraction during a time range, modify the reservation, delay the reservation (e.g., delay the reservation at five minute intervals), transfer a reservation from one PIF 110 to another (e.g., from one group member to another), cancel a reservation, and provide reservation details and updates (e.g., in real-time). As indicated above, the system 100 includes numerous access or interface points that are capable of interfacing with a commerce management system (e.g., a module of the data server system 102 or a separate system in communication with or accessible through the data server system 102) for the amusement park. Indeed, users can access or interface with the system 100 remotely or from the amusement park property via the automated phone system 142, the Internet system 144, the text messaging system 146, or the POS device system 148. In some embodiments, accessing and manipulating reservations may be achieved using the PIF 110, which may be used to communicate with the data server system 102. Indeed, a guest may request that a reservation be moved back (e.g., moved back thirty minutes) or canceled by sending a text message from the PIF 110 or a system-recognized communication device to the data server system 102 because the guest took more time than expected having a meal. All interface points may be assigned the same capabilities depending on available security. For example, if it is determined that there is a risk of losing financial data during a transaction because of limited security from the interface point, access from such an interface point may be limited. Further, access to the system 100 to acquire reservations may be limited depending on the purchase of access rights. For example, a guest may have to purchase a reservation ability to successfully make reservations via the system 100. However, the purchase price of the reservation ability may be set to zero or a purchasing step may be bypassed. When the purchasing step is bypassed, the acquiring of reservations will seamlessly operate such that no indication of a required payment is provided. It should be noted that, in order to access the system 100 and make a reservation that requires access to a particular area or attraction (e.g., amusement park) as a precursor, a user can be required to have already purchased a ticket for the attraction or group of attractions. Indeed, access to making reservations within the system 100 or access to the system 100 itself may be limited to users that own a corresponding ticket or to those with special access (e.g., theme park employees).

Figure 2:
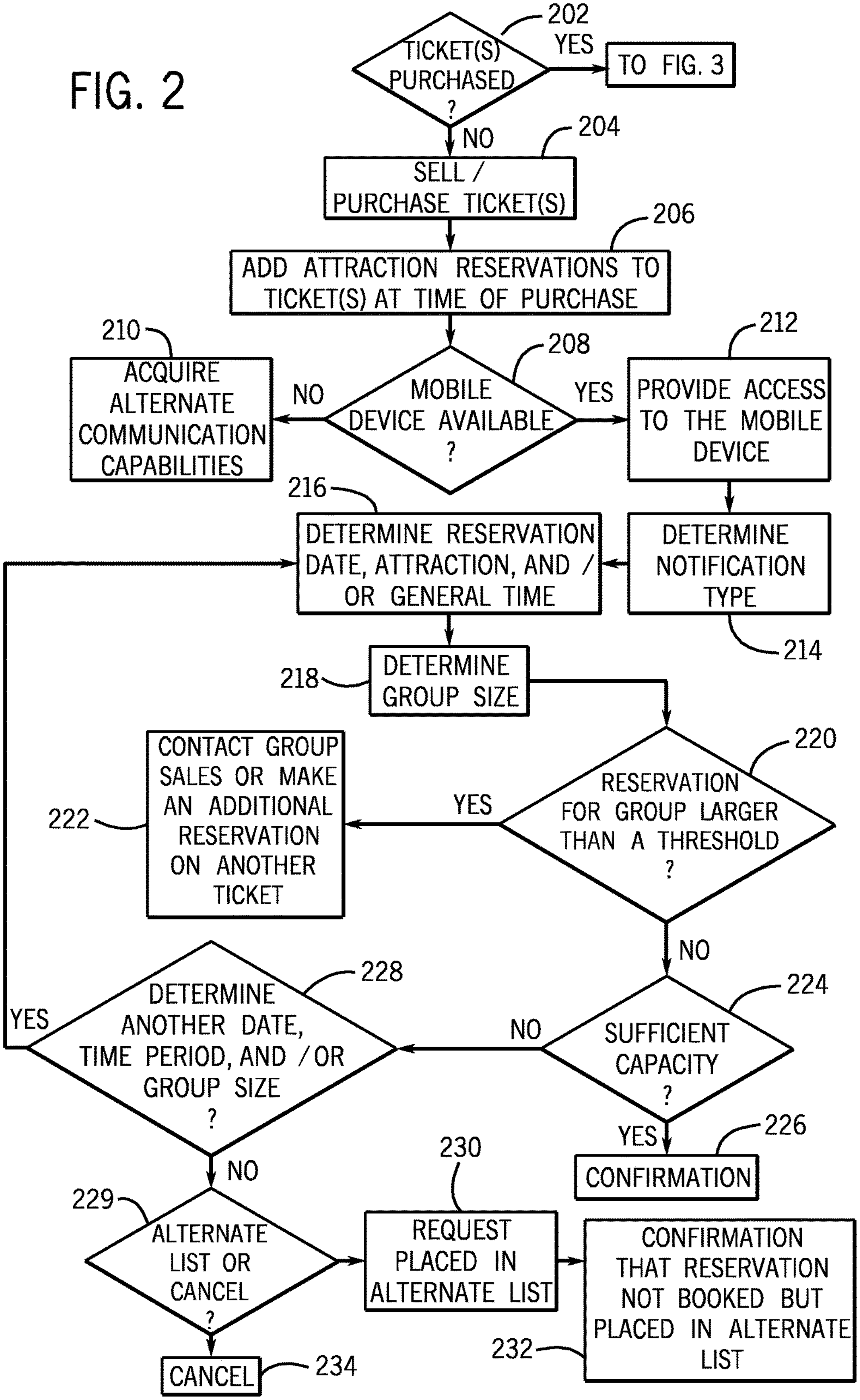
FIG. 2 is a process diagram of a method in accordance with present techniques.
Figure 3:
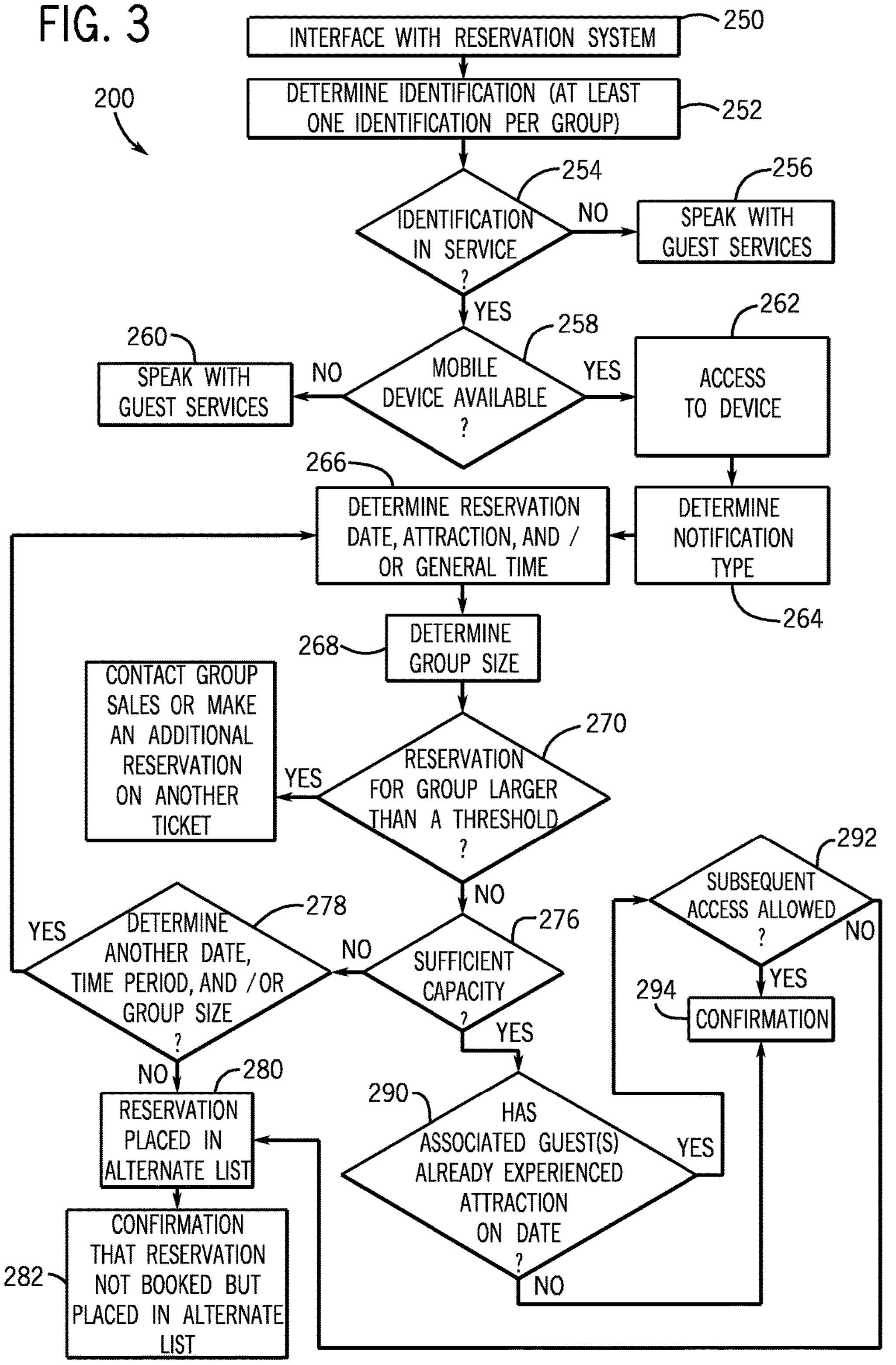
FIG. 3 is a process diagram of a method in accordance with present techniques.

FIGS. 2 and 3 include process flow diagrams for a procedure in accordance with present embodiments. The process is generally indicated by reference numeral 200 and includes various blocks that represent actions or steps of the process 200. The process 200 may be controlled or facilitated by a system, such as the data server system 102 and/or other components of the system 100, in accordance with present embodiments. Indeed, in one embodiment, the data server system 102 includes the processor 118 and the memory 120, wherein the memory 120 stores instructions implemented by the processor 118 to receive inputs of data, manipulate the associated data to transform the inputs into assembled information, and provide outputs corresponding to process steps or actions disclosed herein. Components of the process 200 may be performed by the data reader 108, which may maintain its own data processing capabilities, or other components of the system 100. Further, in different embodiments, certain actions or steps may be performed in a different order.

As illustrated in FIG. 2, the process 200 begins with a determination of whether a ticket or multiple tickets have already been purchased, as represented by block 202. In this context, a ticket is a right to access the amusement park or an attraction 116 of the amusement park. In other contexts, the ticket may be associated with different access rights. As an example, acquiring a ticket may include having the identity of a guest associated with such a right in the system 100. Specifically, for example, a guest may be assigned and provided a guest identification number, and the system may store information in memory identifying that number with a right of access. If tickets have not been purchased, the process 200 facilitates purchasing of tickets, as represented by block 204. In accordance with present embodiments, this purchase of a ticket or tickets is coordinated via the POS device system 148 (e.g., a ticket booth), via the Internet system 144, or via the automated phone system 142. During purchase, an attraction reservation capability may be added to a purchased ticket or multiple purchased tickets, as represented by block 206. The attraction reservation capability may be automatically added in some embodiments as a free component of the ticket. In other embodiments, the attraction reservation capability may be a user-selected option, which may be free or may require an additional fee. The system 100 is capable of giving certain reservations priority over other reservations. Priority may be given to guests that pay extra, very important persons, or guests that perform special tasks.

Block 206 may also represent the actual addition of one or more attraction reservations at the time of purchasing the ticket or tickets, which may include establishing a procedure for communicating information about the reservation. Indeed, block 208 represents prompting a guest to indicate whether a mobile device is available. If the guest does not have access to such a device, the guest may be directed to acquire alternate communication capabilities (e.g., self-provided communication device or park-provided communication device), as represented by block 210. To facilitate this, the guest may be directed to communicate with guest services. Accordingly, guest services can arrange for provision of a mobile device to the guest for purposes of communicating information about reservations and potentially serving as a PIF 110. If the guest would prefer not to use such a mobile device, arrangements can be made for other types of notification and confirmation, such as via kiosks throughout the amusement park and paper tickets. Returning to the prompt provided in block 208, if the guest has a mobile phone, a mobile communication device assigned by the amusement park, or the like, the guest can indicate that such a mobile device is available. In this event, the guest may be further prompted to provide access to the mobile device via a phone number, email address, or the like, as represented by block 212. For example, a guest may provide a phone number that can be used by the system 100 for text or voice communications related to attraction reservations. Indeed, the guest may actually select desired types of notifications, as represented by block 214. This may include selecting whether audio and/or text notifications are sent. The system 100 may prompt the guest to indicate whether text messages are acceptable. If the guest prefers not to use text, automated voice messages may be used. Further, block 214 may represent allowing a guest to determine whether certain types of information are sent to the mobile device. For example, a guest may limit communications to communications that are related to established reservations such that the guest does not receive communications related to coupons, wait times at other areas of the park, and so forth. In some embodiments, certain types of information may be accessed, received, or controlled based on a pricing tier of purchased access rights. For example, a guest with an upper tier access right may receive or access exclusive information about events only available to those with such access rights. As another example, those with upper tier rights may be able to block certain communications (e.g., advertisements) that cannot otherwise be blocked.

Once the manner of communication between the system 100 and the guest has been established, the process 200 continues to establish details of a reservation. As represented by block 216, this may include selecting an attraction, a reservation date, and a general time for the reservation. In some embodiments, only one attraction and/or reservation date is available for reservation, and, thus, an attraction and/or date do not need to be selected. Present embodiments allow a user to make a reservation prior to entering the park to confirm access to a particular attraction. However, the specific time of the reservation may not be made until the guest actually enters the amusement park. Indeed, for example, the specific time of a reservation may not be made until after the ticket associated with the reservation is identified by the guest entry system 104.

In the illustrated embodiment, the guest is requested by the system 100 to provide a general time for a reservation, as illustrated by block 216, to assist with organization of reservations. As previously noted, the actual reservation time will not be established until certain criteria are met. For example, a specific time window (e.g., a 15 minute window of time) for the reservation may not be established until the guest is confirmed to be present in the amusement park and has confirmed that the reservation is still desired. The general time for the reservation may be indicated as morning, afternoon, or evening. In another embodiment, the general time for the reservation may be one of various windows of time (e.g., four hour windows of time) that can be selected by the guest. This indication of a general time may allow for flexibility within the reservation system 100. For example, if a guest indicates a general time for the reservation to be in the morning of a particular day, a determination may be made regarding whether a guest has actually arrived at the park by a certain time in the morning. If the guest has not arrived, the guest may be contacted via the mobile device, which may include a PIF 110, to determine whether an adjustment to or cancelation of the reservation should be made. Certain adjustments to or cancellations of reservations may be automatically made when a guest has not arrived within an indicated window of time, when a guest fails to respond via the mobile device, when a guest provides certain updates (e.g., "will be one hour late"), or the like. As a specific example, when a guest has not arrived by a time that corresponds to the time set as the general time for the reservation, the guest may be prompted to indicate whether the guest still plans on visiting the amusement park. If the guest still plans on visiting the amusement park, the reservation may be adjusted. If the guest is no longer planning to visit the amusement park, the reservation may be canceled. When a reservation is adjusted, other reservations may be moved as well. Further, if a reservation is canceled, other reservations may be moved around and those in an alternate list may be contacted to fill the available reservation slot.

The present system 100 allows for multiple reservations to be made at one time. In one embodiment, multiple reservations may be made and initially associated with a single ticket or with each of multiple tickets. Indeed, in addition to receiving the other information provided in block 216, block 218 represents receiving an indication of a number of guests for the requested reservation. By allowing multiple reservations to be associated with a single ticket, a single group member may make reservations for a group of guests. However, reservations of more than a certain number of guests (e.g., 10 guests) may require approval from amusement park personnel (e.g., a member of a group sales department). Accordingly, block 218 represents receiving an input regarding a number of guests for which the reservation is to be made, which may include indicating that the reservation is for a single guest. Next, as represented by block 220, a determination is made as to whether the reservation is for a group larger than a certain threshold. If the group exceeds the threshold, the guest may be directed to contact a group sales representative for the amusement park or the like, as represented by block 222. This may include automatically connecting the guest via phone or initiating an email to the appropriate contact.

If the group does not exceed the threshold designated for group reservations (e.g., the reservation is for a single guest), the process 200 continues to a determination of whether the attraction for which the reservation has been requested has sufficient capacity, as indicated by block 224. In one embodiment, this action may include communication between the data server system 102 and the attraction system 122. For example, as discussed above, each attraction 116 may include monitoring and/or status management features (e.g., attraction computers) that maintain information regarding reservation times, availability, downtime, and the like. In other embodiments, all of this information may be centrally located (e.g., stored on the data server system 102). If a determination is made that there is sufficient capacity for the requested reservation or reservations, confirmation of the reservation or reservations may be provided to the guest and the reservation is booked, as represented in block 226, and the reservation is booked in the data server system 102 and/or the management system or attraction system 122 for the particular attraction 116 for which the reservation was made. For example, confirmation may include a text message, email, printout, or audio message transmitted from the data server system 102 to the mobile device via the POS device system 148, Internet system 146, the phone system 142, or the text messaging system 146. In other embodiments, the confirmation may simply be provided via the device being employed to make the reservation.

If a determination is made that there is insufficient capacity to accommodate the requested reservation, the process may prompt the guest to select another date, a different time period, or a different attraction, as represented by block 228. In some embodiments, if the group size can be reduced or divided to enable reservations, the guest may be notified of options for dividing the group or reducing the size of the group to obtain available reservation slots. If the guest chooses to make changes to the requested reservations, the process returns to block 216. If the guest chooses not to revise the request, the guest is prompted to select whether placement in an alternate list (a queue for filling slots that become available) or cancellation of the reservation request is desired, as represented by block 229. The prompt in block 229 may make clear that not selecting placement in an alternate list results in cancellation. The requested reservation may be placed in an alternate list when that option is selected, as represented by block 230. Indeed, present embodiments include a waiting list function such that when reservations are not available, the guest can obtain a position in a waiting list for notification of potential reservation slots that become available. Once the guest or group is assigned a position in the alternate list, the guest may be notified that the reservation has not been booked but that the guest and/or group has been assigned a slot in the alternate list, as represented by block 232. If the guest chooses cancellation, the reservation request is simply canceled and the guest is notified, as represented by block 234. As with confirmation of reservations, as discussed above, notification may be achieved by submitting a text message or voice mail to the mobile device or by communicating via the device being employed to request reservations. Further, should an opening for a reservation become available, the guest or group may be notified of the opening via the mobile device or via other notification mechanisms. The guests may be requested to respond to such notification by indicating whether they can fill the slot or not. The guest may be able to respond via the PIF 110 assigned to the guest. If the guest indicates availability to take the open reservation slot, the wait list reservation may be moved into the open reservation slot.

Returning to block 202 of the process 200, if tickets have already been purchased, the process 200 may be directed to contacting the reservation system 100, as represented by block 250 in FIG. 3. Upon accessing the reservation system, the guest may be prompted to confirm identification of the guest or group, as represented by block 252. This may include entering a confirmation number, scanning a physical ticket, accessing an application on a mobile device, or the like. Next, as represented by block 254, a determination is made as to whether the identification information corresponds to a guest pass that is currently valid or in service. If the identification information does not correspond to a valid guest pass, the process directs the user to guest services, as represented by block 256. This may include automatically connecting the guest to amusement park personnel via phone or automatically generating an email directed to the amusement park personnel.

If the system 100 determines that the identification information corresponds to a valid guest pass, a determination may be made as to whether the guest has previously associated the guest pass with a mobile device. If a mobile device has not been associated with the guest, the process 200 continues to block 258, which represents determining whether such a device is available. Many of the following steps are essentially equivalent to steps indicated and described with respect to FIG. 2. Specifically, block 258 represents prompting a guest to indicate whether a mobile device is available. If the guest does not have access to such a mobile device, the guest may be directed to guest services, as represented by block 260. Accordingly, guest services can arrange for communications capabilities for the guest by, for example, provision of a mobile device to the guest for purposes of communicating information about reservations. If the guest would prefer not to use such a mobile device, arrangements can be made for notification via kiosks throughout the amusement park or the like.

Returning to the prompt provided in block 258, if the guest has a mobile phone, a mobile communication device assigned by the amusement park, or the like, the guest can indicate that such a mobile device is available. In this event, the guest may be further prompted to provide access to the mobile device and then provide such access via a phone number, email address, or the like, as represented by block 262. For example, a guest may provide a phone number that can be used by the system 100 for text or voice communications related to attraction reservations. Indeed, the guest may actually select types of notifications, as represented by block 264. This may include selecting whether audio and/or text notifications are sent. The system 100 may prompt the guest to indicate whether text messages are acceptable. If the guest prefers not to use text, automated voice messages may be used. Similarly, emails may be provided as an option. Further, block 264 may represent allowing a guest to determine whether certain types of information are sent to the mobile device. For example, a guest may limit communications to those related to reservations such that the guest does not receive communications related to coupons, wait times at other areas of the park, and so forth. It should be noted that, if a mobile device has already been identified at block 254, the process 200 may continue directly to block 264 or 266.

Once the manner of communication between the system 100 and the guest has been established, the process 200 continues to establishing details of a reservation. As represented by block 266, this may include selecting an attraction, a reservation date, and a general time for the reservation. In some embodiments, only one attraction is made available for reservation, and, thus, an attraction does not need to be selected. As noted above, present embodiments allow a user to make a reservation prior to entering the park to confirm access to a particular attraction. However, the specific time of the reservation may not be made by the system 100 or provided to the guest until the guest actually enters the amusement park. Indeed, for example, the specific time of a reservation may not be made until after the ticket associated with the reservation is identified by the guest entry system 104.

A general time (e.g., morning or afternoon) for a reservation may be requested by the system 100, as illustrated by block 266, to assist with organization of reservations. The general time for the reservation is indicated as morning, afternoon, or evening. In another embodiment, the general time for the reservation may be one of various windows of time that can be selected by the guest. This indication of a general time may allow for flexibility within the reservation system 100. If the guest has not arrived by a time corresponding to the indicated general time, the guest may be contacted via the mobile device or the like to determine whether an adjustment to or cancellation of the reservation should be made. Certain adjustments to or cancelations of reservations may be automatically made when a guest has not arrived within an indicated window of time, when a guest fails to respond via the mobile device, when a guest provides certain updates, or the like. When a reservation is adjusted, other reservations may be moved as well. Further, if a reservation is canceled, other reservations may be moved around and those in an alternate list may be contacted to fill the available reservation slot.

As when purchasing tickets, as illustrated in FIG. 2, the present system 100 allows for multiple reservations to be made with respect to tickets that have already been purchased. Indeed, in one embodiment, multiple reservations may be made and initially associated with a single ticket or with each of multiple tickets. By allowing multiple reservations to be associated with a single ticket, a single group member may make reservations for a group of guests. However, reservations of more than a certain number guests may require approval from amusement park personnel. Accordingly, block 268 represents inputting a number of guests for which the reservation is to be made, which may include indicating that the reservation is for a single guest. Next, as represented by block 270, a determination is made as to whether the reservation is for a group larger than a certain threshold. If the group exceeds the threshold, the guest may be directed to contact a group sales representative for the amusement park or the like, as illustrated by block 272. This may include automatically connecting the guest via phone or initiating an email to the appropriate contact.

If the group size is within the threshold, a determination is made with regard to capacity in the attraction, as represented by block 276. If a determination is made that there is insufficient capacity to accommodate the requested reservation, the process 200 includes prompting the guest to select another date, a different time period, or a different attraction, as represented by block 278. In some embodiments, if the group size can be reduced or divided to enable reservations, the guest may be notified of options for dividing the group or reducing the size of the group to obtain available reservation slots. If the guest chooses to make changes to the requested reservations, the process returns to block 266. If the guest chooses not to revise the request and chooses not to cancel the request, the requested reservation may be placed in an alternate list, as represented by block 280. Indeed, present embodiments include a waiting list function such that when reservations are not available, the guest can obtain a position in a waiting list for notification of potential reservation slots that become available. Once the guest or group is assigned a position in the alternate list, the guest may be notified that the reservation has not been booked by that the guest and/or group has been assigned a slot in the alternate list, as represented by block 282.

If a determination is made that there is sufficient capacity for the requested reservation or reservations, a determination is made regarding whether the guest or guests have already accessed the attraction within a time period (e.g., on the date of the requested reservation, within a morning time period, or the like), as indicated by block 290. If the guest has previously experienced the attraction with the designated time period, a determination is made in block 292 as to whether a threshold amount of access has been reached (e.g., whether the guest or group has experienced the attraction three times in the same day). Such a determination may be made by an access management feature (e.g., a system of the data server system 102 or the system 122). If there is no limit or the limit has not been reached for accessing the attraction, confirmation of the reservation or reservations may be provided to the guest or group, as represented in block 294, and the reservation is booked in the data server system 100 and/or the management system 122 for the particular attraction 116 for which the reservation was made. However, subsequent access to an attraction may be limited based on previous access. If there is a limit on a number of times guests can access the attraction within the time period and that limit has been reached, access to another reservation may be denied, and the guests may be placed in an alternate list, as indicated by block 280. For example, confirmation may include a text message or audio message transmitted from the data server system 102 to the mobile device via the Internet system 144, the phone system 142, the text system 146, or the POS device system 148.

Figure 4A:
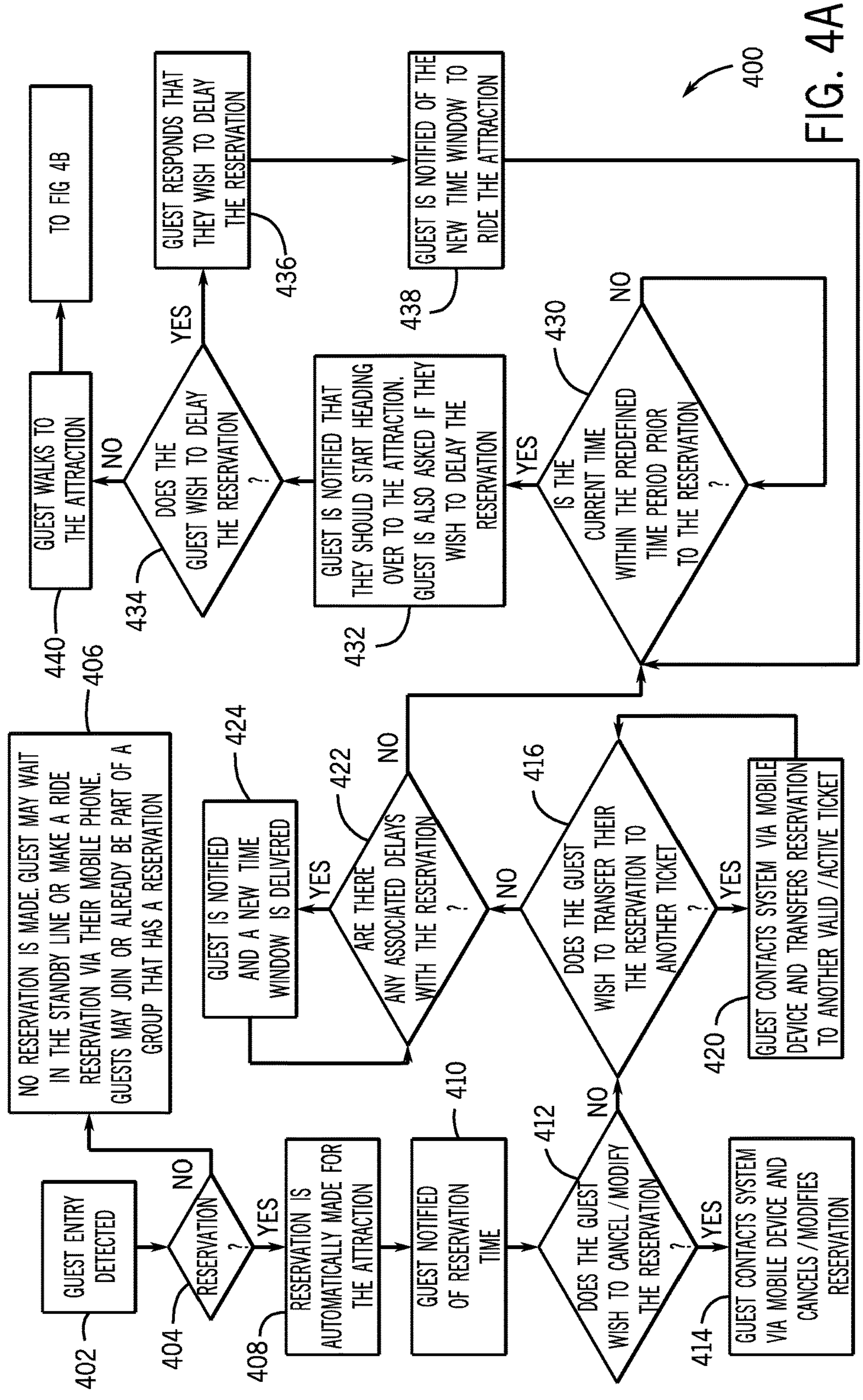
FIGS. 4A and 4B illustrate a process diagram of a method in accordance with present techniques.
Figure 4B:
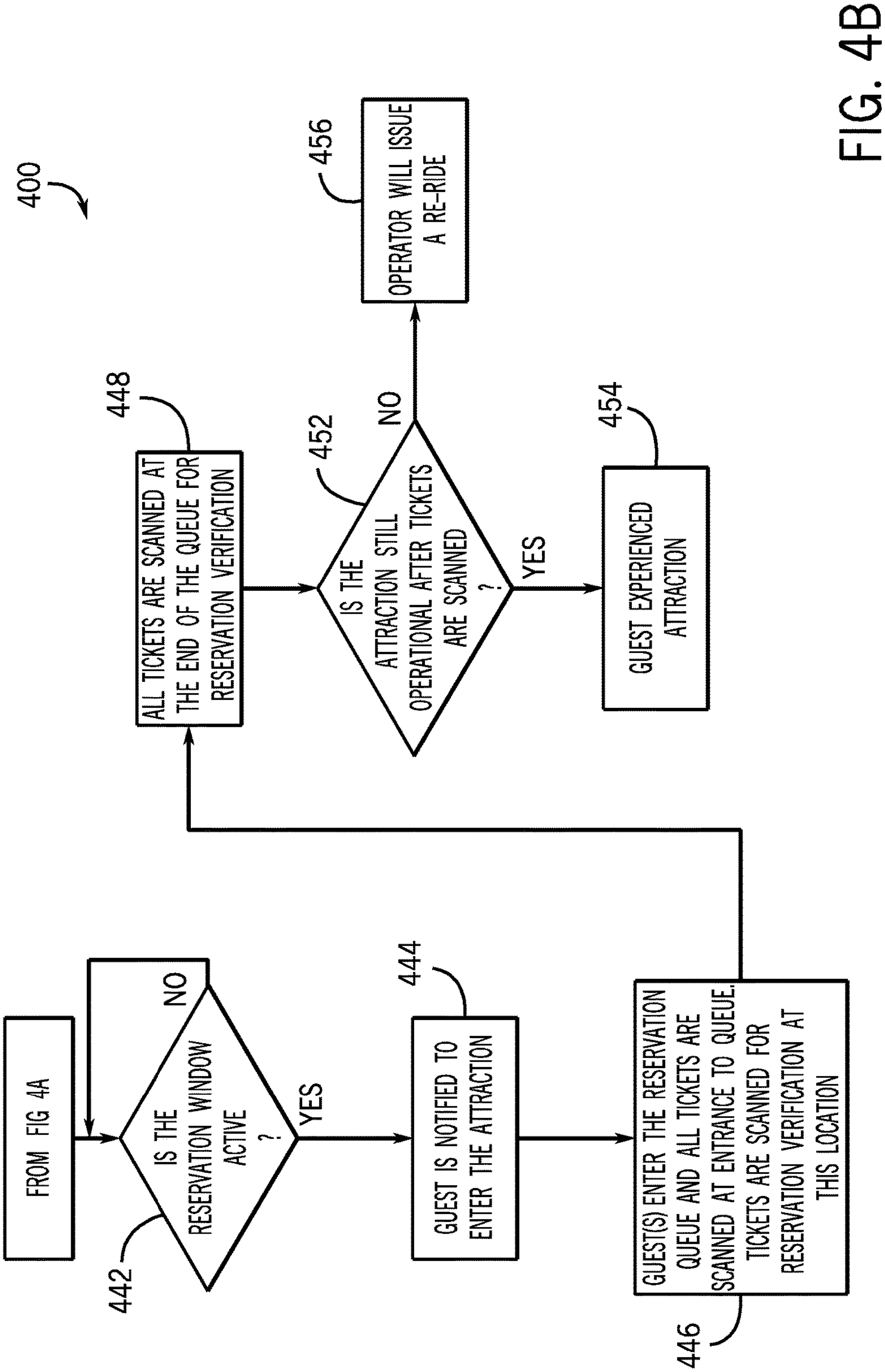

FIG. 4 is a process flow diagram of a method of employing the system 100 in accordance with present embodiments. The process is generally indicated by reference numeral 400 and includes various blocks that represent actions or steps of the process 400. The process 400 may be controlled or facilitated by a system, such as the data server system 102 and/or other components of the system 100, in accordance with present embodiments. Indeed, in one embodiment, the data server system 102 includes the processor 118 and the memory 120, wherein the memory 120 stores instructions implemented by the processor 118 to receive inputs and provide outputs corresponding to process steps or actions disclosed herein. These inputs and outputs may be respectively received from and directed to other components of the system 100 with respect to the data server system 102. Further, in different embodiments, certain actions or steps may be performed in a different order.

Inputs to the system 100 from a guest (before or during the guest's visit) may include a ticket identification, a mobile phone number, a reservation date, a reservation group size, estimated park entry time (e.g., morning or afternoon), associated ticket identifications (e.g., group ticket information), and so forth. Inputs to the system 100 from operators may include data indicative of ride capacity, downtime estimates, operational status of an attraction, re-ride status, queue ratio, messages, advertisements, statistics, and data requests. Automated inputs may include guest park entry time, guest queue entry time, guest queue exit time, standby time estimate, and valid ticket confirmation. Outputs from the system 100 to various systems (e.g., website, mobile site, text messaging system, phone, and POS devices) may include reservation capacity check results, general messaging, advertisements, available reservation dates, and reservation confirmations. Outputs from the system 100 to operators may include allowed ride queue entry messages and reservation approved messages. Outputs from the system 100 to guests may include status updates, reservation modification messages, reservation window messages, time limit warnings, active time window messages, guest-appreciation messages, confirmation of reservations, updates regarding reservations, general messaging, advertisements, and park entry messages. In different embodiments, certain inputs and outputs may be directed to different components.

The process 400 begins with confirming that a guest has appropriate access rights and allowing the guest to enter the amusement park when the access rights are confirmed, as represented by block 402. This step may involve the use of the guest entry system 104. Access rights may be confirmed by determining that the guest has provided identification information (e.g., a bar code on a physical ticket or data stored on a mobile device) that corresponds to a valid right to access the amusement park. For example, this may include scanning a ticket provided by the guest and confirming that the information retrieved from the ticket has been stored in a central database as corresponding to a right of entry on the date of scanning. Indeed, such information may be stored on the central database 102 and issued to the guest electronically or on a physical ticket item at the time of purchase.

After the identification information is confirmed, a determination is made with regard to whether the identification information is associated with an attraction reservation, as represented by block 404. If no reservation has been associated with the identification information, as represented by block 406, the guest may use standby lines to access attractions, join a group that has group reservations, or acquire a reservation. For example, if a guest did not establish reservations prior to arriving at the amusement park, the guest may use the Internet system 144, phone system 142, text system 146, or the POS device system 148 to obtain reservation rights and/or make reservations. If one or more reservations are already associated with the identification information and certain criteria are met, the system 100 automatically establishes specific reservation times, as represented by block 408. Indeed, once the guest is identified as being present in the amusement park, as occurs at block 402, the general time associated with the established reservation is converted into a more specified time (e.g., a time window or general time at which the attraction can be accessed with the reservation) and the guest is provided with a notification (e.g., a voice message, text message, or email) of the reservations via the mobile device or the like, as represented in block 410. As a specific example, upon requesting a reservation, the guest may provide a broad window of time such as "during morning operation hours," "during afternoon operation hours," "during evening operation hours," "between 1:00 PM and 6:00 PM," "between 7:00 AM and Noon", and so forth. Upon confirming the guest's entry into the amusement park, upon confirming that the guest is present in a certain area, or upon the guest checking in, a specific time for the reservation may be assigned by the system 100, such as a window of time from 2:00 PM to 2:15 PM or approximately 3:00 PM. This may not automatically occur when certain criteria are not met. For example, if the guest does not arrive within the predefined time frame (e.g., morning or afternoon), the availability of the reservations may have changed. As another example, the attraction may be unavailable due to technical difficulties. If there are issues with the reservation, these may also be communicated to the guest in the same manner as confirmation of reservations would be communicated.

Once reservations are confirmed, the system 100 may prompt the guest to make available an option to cancel or modify the reservations, as represented by block 412. For example, immediately after notifying the guest of confirmed reservations, the system 100 may request that the guest indicate whether certain reservations should be canceled or modified. If the guest indicates that reservations should be modified or canceled, as represented by block 414, the guest may be directed to guest services or to a component of reservation system 100 that facilitates performing the component of the process 200 set forth in FIG. 3. If the guest does not wish to change any reservations, the reservations may be transferred to other identification information (e.g., identification information associated with a PIF 110 assigned to another guest). For example, a guest with a ticket associated with a particular reservation can transfer the reservation to the ticket of another guest. Indeed, the system 100 may prompt a user or receive a user request to transfer reservations, as illustrated by block 416. The guest may respond by using the mobile device, a kiosk, contacting guest services, or the like to transfer the reservation to the identification information for another access pass, as represented by block 420. Numerous reservations may be transferred at once or a series of transfers may be performed in a loop operation, as indicated by the arrow pointing from block 420 to block 416, until the desired transfers have been completed. It should be noted that the system 100 may allow guests to change or modify reservations within certain time windows (e.g., at least 30 minutes before the reservation time) or any time before the time slot of the existing reservation. This may include canceling an existing reservation and attempting to replace it with a time slot preferred by the guest, trading an existing reservation with another guest, canceling an existing reservation and being put in a virtual standby queue, or the like. When a guest is attempting to change an existing reservation, that guest may be given priority over guests without existing reservations for purposes of selection of other available time slots for a replacement reservation.

Once all transfers have been made, a determination may be made regarding associated delays or other issues with the reservations, as indicated by block 422. This may include periodically updating and continuously monitoring attraction information from monitoring systems (e.g., attraction systems 122) associated with the related attractions. If issues are identified that will cause changes in reservations, the guest may be notified via text message, voice message, email, or via a kiosk display of a new time window for the reservation, as represented by block 424. The notification may also include an indication of the nature of the delay or change. Further, any conflicting reservations may be automatically adjusted. For example, if the changed reservation time conflicts with an established reservation time, the established reservation time may be automatically changed or the guest may be prompted to define a desired result from a selection of available options.

If no issues are identified with respect to changes in reservations, the process 400 may continue to monitor whether a time period before the reservation has been reached, as represented in block 430. For example, block 430 could represent a determination as to whether the current time is 15 minutes or less prior to the reservation (e.g., a time window). If the current time is not 15 minutes or less prior to the reservation, the process 400 continues to monitor. If the current time is 15 minutes or less prior to the reservation, the guest is provided with a reminder that the reservation time is near, as represented by block 432. This may include a suggestion that the guest begin moving toward the attraction. It should be noted that the time period before which the guest is notified may vary depending on the location of the guest. For example, if the system 100 identifies that the guest is in a particular location from which it generally takes a certain amount of time to travel to the attraction for which the guest has a reservation, the time period associated with the reservation reminder notification may be based on this distance and corresponding travel time.

After receiving the reservation reminder notification, the system 100 may enable a guest to move the reservation back or postpone the reservation. For example, a guest may be prompted or allowed to request a delay in the reservation, as indicated by block 434. If the guest chooses to delay the reservation, the guest may notify the reservation system 100 via the mobile device or other access points to the reservation system 100, as represented by block 436. The reservation system 100 may respond to such a request with information regarding a new reservation at a later time, a selection of reservation times that are available at later times, or an indication that no later times are available. The system 100 may then enable the guest to respond by, for example, confirming or selecting a supplied later time or declining to change the existing reservation. If a new reservation is established, the system 100 provides confirmation of the revised reservation, as indicated by block 438, and the process continues to monitor the current time relative to the reservation, as indicated by block 430. It should also be noted that, at any time in the process, a guest might choose to cancel their reservation in addition to modifying it.

If the guest elects not to delay the reservation, the guest may begin walking to the attraction, as represented by block 440. As noted above, the reservation reminder may account for the distance that will be traveled by the guest by monitoring the location of the guest and providing a reminder a corresponding amount of time in advance of the reservation time. A determination may be made regarding when the reservation time becomes active, such as when the current time enters a time window for the reservation, as represented by block 442. This is continuously monitored in the illustrated embodiment. When the current time corresponds to the reservation (e.g., the current time is within the reservation window), the guest is notified that the reservation is active and that the guest should enter the attraction, as indicated by block 444. When the guest enters a queue associated with the attraction, the guest may be required to confirm that they have a reservation by providing appropriate identification information, as indicated by block 446. For example, the data reader 108 of the system 100 may be used to scan tickets or interface with a mobile device at the entrance to a short reservation queue or an entry point to confirm that the guest has a reservation.

When an initial confirmation of guest identification and reservation information (e.g., a ticket scan) is performed at the entrance to a queue, further verification may be required prior to actually entering the attraction (e.g., boarding a ride), as represented by block 448. This may facilitate monitoring of the queue length at the associated attraction. Future provision of reservations and access provided to standby queues may be adjusted based on this measurement to control the wait time in the reservation queue. For example, during steady operation, present embodiments may control the approximate time spent by guests in a reservation queue to be around 10 minutes. Indeed, the system 100 may instruct an operator to allow guests to exit a queue and board an attraction as designated intervals based on an algorithm accounting for queue characteristics. Confirming identification information (e.g., scanning a ticket and accessing associated reservation data) for a guest entering a ride may also facilitate monitoring and control of subsequent access to attractions. For example, this may be used to indicate that a guest has already accessed a particular attraction using a reservation. An indication may be stored on the system 100 and associated with the identification information such that subsequent requests for reservations can be controlled based on whether certain attractions have already been accessed by the guest. This may include scanning tickets and so forth after the guests exit an attraction.

The system 100 may employ an algorithm that takes into account that certain guests may have accessed an attraction just prior to the attraction experiencing technical difficulties and becoming inoperable. For example, block 452 represents determining whether a guest checked in to an attraction but did not get to experience the attraction due to technical difficulties or the like. If the attraction was functional, the guest is indicated as having experienced the attraction, as represented by block 454. If the attraction was not functional, the guest may be automatically assigned another reservation or an immediate access right upon correction of the technical difficulty or the like, as represented by block 456. An attraction may be considered nonfunctional when access to the attraction is prevented or when the attraction experience is interrupted.

Present embodiments will allow for reservation trading via a reservation trading system, which may be a component or module of the data server system 102. This functionality may be available when the system 100 is in use with multiple attractions. For example, a first guest may have a reservation to access a first ride at 1:00 PM. However, the first guest may be eating lunch and will not be able to reach the attraction in time for this reservation. The system may prompt the first guest a certain time (e.g., 15 minutes) prior to the reservation to determine whether the first guest plans to keep the reservation. The time of prompting may be based on a detected location of the guest relative to the attraction 116 for which the reservation has been established. Since the first guest is unable to reach the first attraction in time, the first guest may respond by indicating that the reservation is not going to be kept. The system 100 may then automatically look for a later reservation for the first guest. A second guest may have a reservation at 4:00 PM and may be currently located near the first attraction, as determined by the system 100. The system 100 may identify this second guest based on location and time of reservation, and send the second guest a message indicating that a trade is available for the reservation held by the first guest. If the second guest accepts the trade, the reservations may be transferred between the first and second guests by the system 100 and the guests respectively notified of their new reservations. This assists with maintaining full capacity while eliminating stresses on guests associated with making appointments on time.

Figure 5:
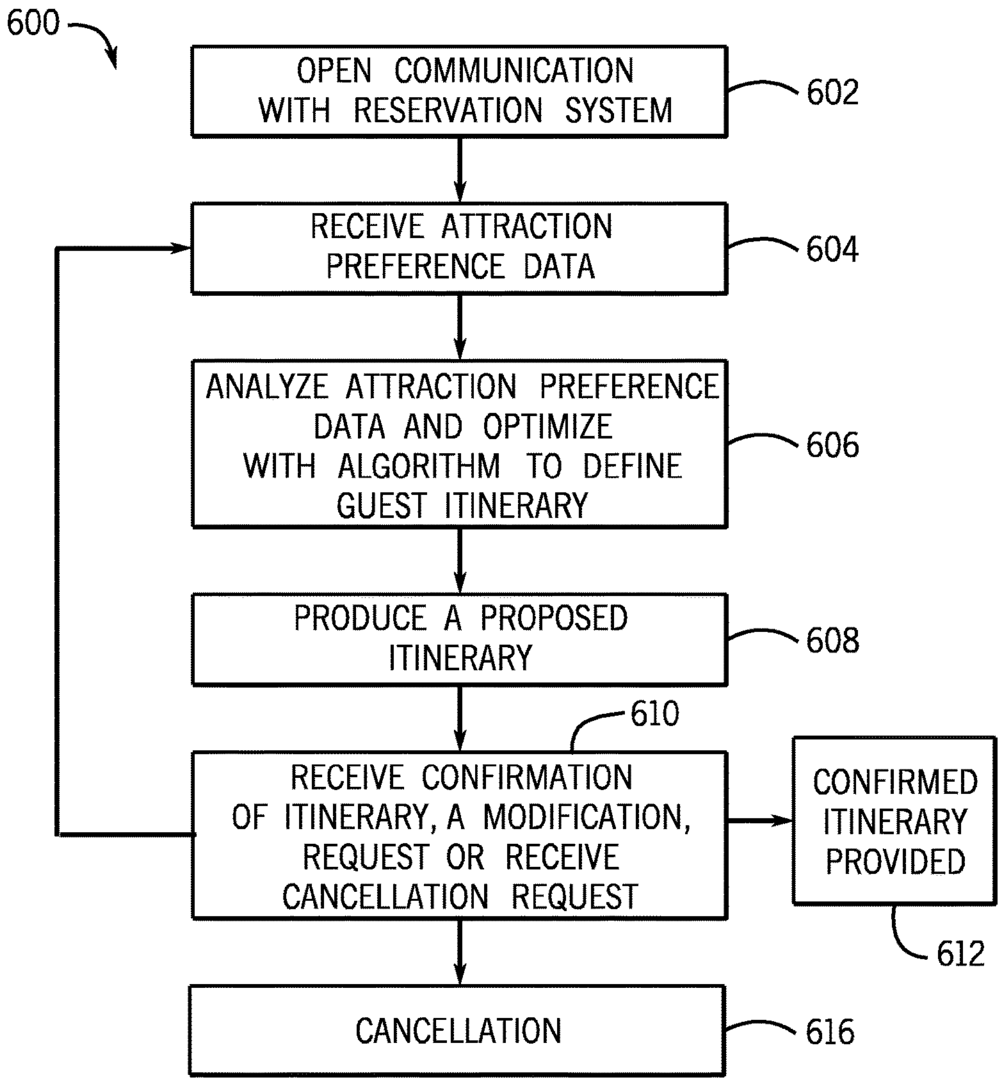
FIG. 5 is a process diagram of a method for facilitating guest scheduling of multiple reservations for attractions in accordance with present techniques.

Present embodiments include a process and system configured to provide each of multiple different guests or groups with multiple reservations or an itinerary based on input from the guests. For example, FIG. 5 is a process flow diagram that provides a general overview of a process 600 for facilitating guest scheduling of multiple reservations for attractions ranging from rides to restaurants in accordance with present embodiments. The process 600 of FIG. 5 generally illustrates establishing an itinerary that substantially optimizes the guests' time in the park and the park facilities. It should be noted that the process 600 is illustrated at a high level and may include the specific process features discussed above with respect to FIGS. 2-4. Further, the process 600 may be implemented using all or some features of the system 100 discussed above.

The process 600 begins with enabling guests to communicate with a reservation system and provide certain attraction preferences, as represented by block 602. This may include providing access to a reservation system for guests inside or outside of the park. For example, guests may provide a list of certain attractions the guests are interested in experiencing or types of attractions the guests are interested in experiencing. This may include providing specific attractions and preferred times for associated reservations along with a ranking indicating a level of interest in each attraction. However, the guests may choose to simply provide a list of attractions of interest and allow the system to propose times. Similarly, the guests may simply provide certain attraction types (e.g., rides appropriate for small children) and allow the system to propose an itinerary. Once the preferences are entered, the reservation system receives the associated data, as represented by block 604, and then processes the data to substantially optimize a schedule for each guest and optimize utilization of the park attractions, as represented by block 606. In response to the preferences provided by the guests, the reservation system may perform an optimization algorithm and output a proposed itinerary, as represented by block 608. In one embodiment, the guest may provide input before entering the park but will not receive a proposed itinerary until after entering the park.

The algorithm represented as being performed in block 606 may be stored on a memory and performed by a processor of the system (e.g., a processor 118 of data server system 102) to produce a proposed itinerary, as represented by block 608. The guest may then confirm the itinerary or request a different itinerary after reviewing the proposed itinerary, as represented by block 610. If confirmation is received by the system, the process provides a confirmed itinerary, as represented by block 612. If the guest elects to modify the itinerary, the guest may be prompted to indicate whether specific modifications are requested or cancellation is desired. If cancellation is desired, the process ends and cancellation is confirmed, as represented by block 616. If modifications are desired, the process may return to block 604 and/or enable changes to the schedule. It should note be noted that the system may provide proposed modifications based on attraction availability and recognized limitations of the guest's preferred schedule based on optimization data at any point in the process 600.

The algorithm represented as being performed in block 606 may function to identify the location of the attractions listed as being of interest to the guests and determine a schedule based on a number of factors or optimization data, such as ease of transition between individual attractions of interest. For example, the system may propose an itinerary that includes reservations for the guests' preferred attractions in a series that allows the guests to move from attraction to attraction throughout the park without requiring the guests to backtrack. The itinerary may also include proposed reservations for attractions along the path based on gaps in the schedule. In addition to taking distances and locations of attractions into consideration, the algorithm may consider maximization of operational efficiency of the park, the reservations of others, levels of interest, mealtimes, overlapping schedules with other guests designated as being in a common group (e.g., social network), and so forth. For example, the optimization algorithm may propose an itinerary that limits travel between attractions but accommodates a lack of availability of reservations at a particular time for a highly desired attraction. The algorithm may also direct guests throughout the park to avoid predicted overcrowding in particular areas based on established reservations and historic park data. The algorithm may also take into consideration that a break would be required around a mealtime and propose reservations at a restaurant attraction or simply suggest nearby restaurants. The algorithm may also take certain practical matters into consideration. For example, the algorithm may adjust the itinerary to exclude certain high intensity attractions for a certain time period after meals. The algorithm may also attempt to maximize utilization of the park by proposing reservations or visits to attractions that are underutilized at certain times. In one embodiment, the algorithm considers rankings of levels of interest (e.g., high, medium, low) provided by guests regarding attractions and provides an itinerary that accounts for this. For example, the algorithm may arrange reservations for attractions of high interest to be spread throughout the day to keep interest up through the day or to all occur early in the day to make sure that all of the high interest attractions are experienced early.

Figure 6:
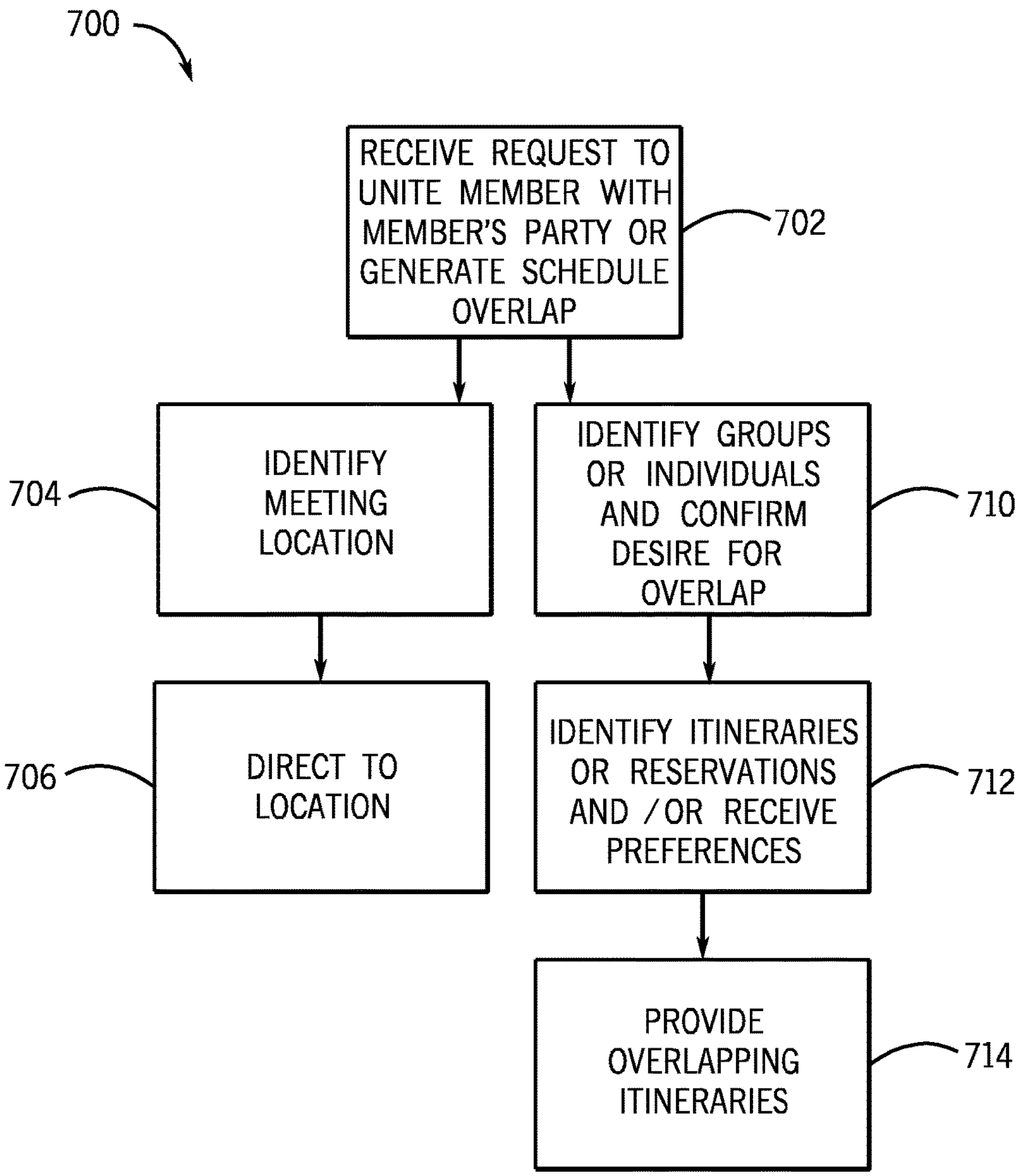
FIG. 6 is a process diagram of a method for coordinating guest schedules in accordance with present techniques.

Present embodiments may also facilitate group meetings within the park for parties that arrive separately, parties that separate once inside the park, or parties that desire a certain overlap in scheduling. For example, FIG. 6 illustrates a process 700 performed in accordance with present embodiments for coordinating guest schedules. The process begins with prompting the guest to indicate whether the guest would like to unite with a party of which the guest is already a member or whether the guest would like to have an itinerary that overlaps with that of another party. This initial procedure is represented by block 702 and may be performed using any of the access features discussed above with respect to the system 100, such as a cellular telephone in coordination with the system 100. Block 702 includes identifying the guest and the group.

If the guest wishes to meet with a group or party of which the guest is a member, the process may identify a meeting location, as represented by block 704, and direct the guest to the location and/or instruct the party to meet the guest at the location, as represented by block 706. This will generally occur when guests do not arrive to the park with their party or split off from their party during a visit. To facilitate regrouping of a party, present embodiments may utilize PIF positioning information to direct the guest to the desired party, use the established itinerary for the party to provide the meeting location, use guest-to-guest communications to communicate the meeting location, and/or use system-to-guest communications to communicate the meeting location. For example, the next attraction on the itinerary may be provided to the guest and the party may be informed via a text message that the guest will be joining the party for the reservation at the next attraction. Further, guest-to-guest communication may be facilitated between the party and the guest via the reservation system (e.g., text messaging or voice communications).

If the guest wishes to establish an overlap between the guest or the guest's group or party and at least one other group, the process 700 proceeds to block 710 in the illustrated embodiment. This may occur when two or more groups or individuals decide to spend time together at the park. For example, groups from a particular area may decide to establish overlapping schedules so that they can experience attractions of common interest together while experiencing other attractions in their separate groups. The groups or individuals may already have reservations (e.g., itineraries) or not. Block 710 generally represents identifying the groups or individuals and confirming a desire to have overlapping attraction experiences. Once this is established, a determination is made as to whether the one or more groups have existing itineraries or reservations, and preferences are provided where no itineraries or reservations are established, as represented in block 712. Existing itineraries and reservations are taken into consideration and preferences are otherwise provided. This may include providing attractions of common interest and desired overlap. An algorithm is then performed based on common interest of the guests based on explicit designations, comparison of preferences, comparison of existing itineraries, and/or optimization data to provide overlapping itineraries for the two or more individual guests or groups of guests, as represented by block 714.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:

receiving attraction preference data into a reservation system before a guest enters a park, wherein the attraction preference data includes an attraction list comprising a plurality of attractions of the park selected by the guest and a guest-designated level of interest in each attraction of the plurality of attractions selected by the guest, wherein the plurality of attractions of the park selected by the guest are attractions of the park that the guest is interested in experiencing;

analyzing the attraction preference data to produce analysis results using an algorithm performed by a processor of the reservation system, wherein the algorithm is configured to perform the analysis using attraction availability data generated from electronic monitoring of the plurality of attractions associated with the attraction list, location data associated with the attraction list, park utilization data, and the guest-designated level of interest in the respective attractions;

electronically detecting a portable identification feature associated with the guest at an entrance into the park using a guest entry system of the reservation system, wherein electronically detecting the portable identification feature comprises polling the guest entry system of the reservation system at predetermined intervals to retrieve information indicative of detection of the portable identification feature to automatically identify that the guest has arrived at the park, and displaying a proposed itinerary on the portable identification feature for the guest to confirm, modify, or cancel in response to determining that the guest has entered the park, wherein the proposed itinerary is based on the analysis results, wherein the proposed itinerary comprises reservations for the guest, and wherein one or more of the reservations has a specific time window for the guest to access a respective attraction from the attraction list; and presenting the proposed itinerary according to the analysis results, wherein the reservations are presented in series such that the guest is guided to a series of attractions in a manner that limits backtracking.

2. The method of claim 1, comprising initiating a reminder of the reservations at a prompting time prior to a respective specific time window of one of the reservations, wherein the prompting time is based on a location of the guest relative to a location of the respective attraction.

3. The method of claim 1, wherein the algorithm is configured to perform the analyzing using rankings of levels of interest between each attraction of the plurality of attractions of interest by the at least one user.

4. The method of claim 1, wherein the algorithm is configured to perform the analyzing using historic park data associated with the plurality of attractions of interest.

5. The method of claim 1, comprising assigning the reservations having the specific time windows for accessing the one or more attractions to the portable identification feature associated with the guest and to another portable identification feature associated with another guest.

6. The method of claim 1, wherein presenting the proposed itinerary comprises presenting the reservations for attractions in the attraction list designated by the guest as high interest to be interspersed throughout the proposed itinerary such that interest of the guest is maintained throughout the duration of the proposed itinerary.

7. The method of claim 1, wherein presenting the reservations according to the attraction preference data and the user-designated level of interest comprises presenting the reservations designated as high interest early in the proposed itinerary.

8. The method of claim 1, comprising adjusting the proposed itinerary to exclude certain high intensity attractions for a period of time following a reservation at a restaurant of the park.

9. The system of claim 1, wherein the portable identification feature comprises a cellular telephone.

10. The system of claim 1, wherein the portable identification feature comprises a wearable feature.

11. The system of claim 10, wherein the wearable feature comprises a bracelet having integral circuitry.

12. A method comprising:

receiving a request to generate an overlapping itinerary for a park between a first group of guests and a second group of guests via a reservation system;

identifying, via the processor of the reservation system, one or more existing itineraries for the park or preferences relating to the park of the first group of guests and the second group of guests, wherein the one or more existing itineraries for the park or preferences relating to the park comprise a first plurality of attractions selected by the first group of guests and a second plurality of attractions selected by the second group of guests, and wherein the first plurality of attractions selected by the first group of guests are attractions the first group of guests are interested in experiencing and the second plurality of attractions selected by the group of guests are attractions the second group of guests are interested in experiencing;

generating one or more overlapping itineraries for the first group of guests and the second group of guests based on common attractions between the first plurality of attractions selected by the first group of guests and the second plurality of attractions selected by the second group of guests identified via the one or more existing itineraries or preferences, wherein the overlapping itineraries comprise reservations, each reservation having a specific time window for the first group of guests and the second group of guests to access an attraction of the park, wherein the reservations are presented according to attraction preference data and a designated level of interest in one or more attractions, wherein the designated level of interest in the one or more attractions is provided by the first group of guests, the second group of guests, or both, and wherein the reservations are presented in series such that the first group of guests and the second group of guests are guided to a series of attractions in a manner that limits backtracking;

detecting a first portable identification feature associated with the first group of guests and a second portable identification feature associated with the second group of guests at an entrance to the park using a guest entry system of the reservation system;

wherein detecting the first portable identification feature and the second portable identification feature comprises polling the guest entry system of the reservation system at predetermined intervals to receive data indicative of detection of the first portable identification feature and detection of the second portable identification to automatically identify that the first group of guests and the second group of guests have arrived at the park; and displaying the overlapping itineraries to the first group of guests on the first portable identification feature associated with the first group of guests when the first group of guests arrive at the park and to the second group of guests on the second portable identification feature associated with the second group of guests when the second group of guests arrive at the park.

13. A queue management system, comprising:

a reservation system including at least one processor and memory, the memory storing instructions that when executed by the at least one processor, cause the reservation system to:

receive attraction preference data before a guest enters a park, wherein the attraction preference data includes an attraction list comprising a plurality of attractions of the park selected by the guest and a guest-designated level of interest in each attraction of the plurality of attractions selected by the guest, wherein the plurality of attractions of the park selected by the guest are attractions of the park that the guest is interested in experiencing;

analyze the attraction list utilizing an algorithm stored in the memory to produce analysis results, wherein the algorithm is configured to analyze the attraction list based on attraction availability data associated with the attraction list, location data associated with the attraction list, park utilization data, and the guest-designated level of interest in respective attractions in the attraction list;

detect a portable identification feature associated with the guest using a guest entry system reservation system at an entrance into the park by polling the guest entry system of the reservation system at predetermined intervals to retrieve information indicative of detection of the portable identification feature to automatically identify whether the guest has entered the park, wherein the portable identification feature comprises a wearable feature;

generate, in response to determining that the guest has entered the park, a proposed itinerary for the guest based on the analysis of the attraction list, wherein the proposed itinerary comprises reservations for the guest, and wherein one or more of the reservations has a specific time window for the guest to access a respective attraction from the attraction list; and display on the portable identification feature the proposed itinerary with the reservations in series such that the guest is guided to a series of attractions in a manner that limits backtracking.

14. The queue management system of claim 13, wherein the instructions, when executed by the at least one processor, cause the reservation system to notify the guest in response to determining that a detection system of the reservation system detects the portable identification feature has not arrived to a particular attraction in the attraction list within a general time period of arrival.

15. The system of claim 13, wherein the instructions, when executed by the at least one processor, cause the reservation system to monitor wait times of a queue for any one of the attractions in the attraction list in response to detecting the presence of the portable identification feature at an entry to the one of the attractions in the attraction list and after detecting the presence of the portable identification feature at an entry into the queue for the one of the attractions.

16. The queue management system of claim 13, wherein the instructions, when executed by the at least one processor, cause the reservation system to allow or deny access to attractions in the park using the portable identification feature and based on a number of times the portable identification feature has been used to access a respective attraction in the attraction list relative to a threshold for repeated access to the respective attraction.

17. The queue management system of claim 13, wherein the instructions, when executed by the at least one processor, cause the reservation system to send a reminder of a respective reservation of the one or more reservations to the guest at a prompting time prior to the respective specific time window of the reservation, wherein the prompting time is based on a location of the guest relative to a location of the attraction corresponding to the reservation.

18. A queue management system comprising:

a reservation system including at least one processor and memory storing code that is executable by the at least one processor;

an interface system of the reservation system configured to enable a guest to interface with at least a portion of the reservation system to enter a reservation request relating to a plurality of attractions of a park before the guest arrives at the park, and to receive the reservation request, wherein the interface system is configured such that the reservation request received by the interface system includes a guest-designated arrival period indicating a general time window during which the guest expects to arrive to the park, attraction preference data including an attraction list of specific attractions selected by the guest and a guest-designated level of interest in a specific attraction from the attraction list, and identification information associated with a portable identification feature of the guest, wherein the attraction list of specific attractions selected by the guest includes attractions that the guest is interested in experiencing;

a reservation right allotment module stored in the memory of the reservation system, wherein the reservation allotment module is configured to set aside a reservation slot associated with the general time window for the guest from an inventory having a limited number of available reservation slots associated with the general time window, wherein the reservation slot confirms access for the guest to at least one specific attraction during the general time window without establishing a particular hourly time for the confirmed access, and wherein the reservation right allotment system is configured to associate the reservation slot with the portable identification feature;

a detection module stored in the memory of the reservation system, wherein the detection module is configured to electronically detect the portable identification feature associated with the guest at an entrance to the park to automatically identify whether the guest has arrived to the park; and a reservation assignment module stored in the memory of the reservation system, wherein the reservation assignment module is configured to convert the reservation slot into a reservation having a specified hourly time at which the guest has confirmed access to the specific attraction, the specified hourly time being narrower than the general time window, wherein the reservation assignment module is configured to convert the reservation slot into the reservation in response to the reservation system detecting the portable identification feature, and wherein the reservation assignment module is configured to display the reservation on the portable identification feature associated with the guest in response to the detection system detecting the portable identification feature.

19. The system of claim 18, wherein the interface system is configured such that the guest-designated arrival period is the morning or the afternoon of a particular date.

20. The system of claim 18, wherein the reservation system is configured to:

produce a proposed itinerary on the portable identification feature in response to detecting the portable identification feature, wherein the proposed itinerary is produced according to an algorithm that uses at least the reservation slot, an actual time at which the portable identification feature is detected, the attraction preference data, and electronic monitoring of specific attractions in the attraction list as inputs, and wherein the proposed itinerary includes a plurality of reservations, each reservation of the plurality of reservations having a specific time window during which the guest has confirmed access to a respective attraction from the attraction list; and enable the guest to confirm, modify, or cancel the proposed itinerary.

* * * * *